US006593985B1

(12) United States Patent
Taira et al.

(10) Patent No.: US 6,593,985 B1
(45) Date of Patent: Jul. 15, 2003

(54) COLOR SHUTTER AND COLOR IMAGE DISPLAY APPARATUS

(75) Inventors: Kazuki Taira, Tokyo (JP); Shigeki Uno, Yokohama (JP); Tatsuo Saishu, Yokohama (JP); Kohei Suzuki, Yokohama (JP); Ryoji Tsuda, Fujisawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 310 days.

(21) Appl. No.: 09/650,814

(22) Filed: Aug. 30, 2000

(30) Foreign Application Priority Data

Sep. 30, 1999 (JP) .............................................. 11-280352

(51) Int. Cl.[7] ........................................... G02F 1/1347
(52) U.S. Cl. ............................. 349/119; 349/18; 349/78
(58) Field of Search ................................ 349/9, 16, 18, 349/74, 78, 80, 119

(56) References Cited

U.S. PATENT DOCUMENTS

| 4,239,349 A | * | 12/1980 | Scheffer ...................... 349/117 |
| 5,347,378 A | * | 9/1994 | Handschy et al. ............ 349/78 |
| 5,751,384 A | | 5/1998 | Sharp |
| 5,892,559 A | | 4/1999 | Sharp |
| 6,417,892 B1 | * | 7/2002 | Sharp et al. ................. 348/742 |

FOREIGN PATENT DOCUMENTS

| JP | 9-505912 | 6/1997 |
| JP | 11-287988 | 10/1999 |
| JP | 2000-089208 | 3/2000 |

OTHER PUBLICATIONS

G. D. Sharp, et al., "Retarder Stack Technology for Color Manipulation," SID 99 Digest, 1999, pp. 1072–1075.

* cited by examiner

Primary Examiner—Robert H. Kim
Assistant Examiner—Andrew Schechter
(74) Attorney, Agent, or Firm—Oblon, Spivak, McClelland, Maier & Neustadt, P.C.

(57) ABSTRACT

A color shutter, comprising first, second and third polarizers, first and second retarders, first and second polarizing rotators, and at least one absorption type partial polarizer. The color shutter is constructed such that the first retarder is arranged between the first polarizer and the second polarizer, that the second retarder is arranged between the second polarizer and the third polarizer, that the first polarizing rotator is arranged between the first polarizer and the second polarizer, that the second polarizing rotator is arranged between the second polarizer and the third polarizer, at least one of the first polarizing rotator and the second polarizing rotator is arranged in a manner to be sandwiched between the second polarizer and the first or second retarder, that the absorption type partial polarizer is arranged between the first polarizing rotator and the first retarder and/or between the second polarizing rotator and the second retarder, and that the transmitted light can be changed into the three primary colors of RGB by selecting the voltage applied to the first and second polarizing rotators.

15 Claims, 14 Drawing Sheets

COLOR SHUTTER AND COLOR IMAGE DISPLAY APPARATUS

CROSS-REFERENCE TO RELATED APPLICATIONS

This application is based upon and claims the benefit of priority from the prior Japanese Patent Application No. 11-280352, filed Sep. 30, 1999, the entire contents of which are incorporated herein by reference.

BACKGROUND OF THE INVENTION

The present invention relates to a color shutter for field-sequentially separating a white light into RGB components, and a display apparatus for displaying a color image by field-sequentially mixing the color components.

A system for displaying a color image includes a spatial division display for displaying an RGB image by dividing the RGB image into the RGB components for pixels and a field-sequential additive color mixing display in which an RGB image is displayed with time and an RGB color filter is switched in synchronization with the image.

The field-sequential additive color mixing display is superior to the spatial division display in fineness because the pixel need not be divided into RGB components in the field-sequential additive color mixing display. In the field-sequential additive color mixing display, the method of rotating a disc-like filter divided into three color regions of RGB in synchronization with each RGB image display is most widely known to the art.

A method of switching the displayed color without using a mechanical rotation mechanism is disclosed in, for example, U.S. Pat. No. 5,387,920 to Bos et al. Specifically, proposed is a so-called "liquid crystal color shutter system" in which a color polarizer is arranged on each of the front surface and the rear surface of two liquid crystal cells, and the polarizing plane of the light is controlled by the on/off switching of the liquid crystal cells so as to select the wavelength of light absorbed by the polarizer and, thus, to achieve an RGB display.

In the liquid crystal color shutter disclosed in this prior art, a plurality of color polarizers differing from each other in the color phase are arranged on an optical path such that the absorption axes are rendered perpendicular to each other. For example, a yellow color polarizer, which transmits green and red lights and absorbs a wavelength region of blue, and a blue color polarizer, which absorbs a wavelength region of yellow, are arranged such that the absorption axes of these two polarizers are rendered perpendicular to each other. Similarly, a red color polarizer and a cyan color polarizer are arranged such that the absorption axes of these two polarizers are rendered perpendicular to each other. Further, a liquid crystal cell is arranged between these two sets of color polarizers, and an achromatic polarizer, which is a linear full wavelength polarizer region, and a liquid crystal cell are added so as to select the axis of polarization of the incident light or leaving light.

It should be noted that a red display can be achieved by using a polarized light transmitting through the absorption axes of the yellow color polarizer and the red color polarizer. Also, a green display can be achieved by the combination of the yellow color polarizer and the cyan color polarizer. Further, a blue display can be achieved by the combination of the blue color polarizer and the cyan color polarizer.

The liquid crystal color shutter is advantageous in that a mechanical operation is not involved therein, and its space saving because the area of the display screen can be made equal to the area of the color shutter.

In the liquid crystal color shutter, a colorant-based color polarizer prepared by impregnating a PVA (polyvinyl alcohol) substrate with a dichroic colorant, followed by applying an orienting treatment by stretching to the impregnated PVA substrate is used as the color polarizer. As shown in FIG. 1, the colorant-based color polarizer is a partial polarizer capable of absorbing a specified wavelength of a polarized light having a polarizing plane in the direction of the absorption axis.

The liquid crystal color shutter using the particular colorant-based color polarizer is defective in that the transmittance is markedly low. For example, the absorption axis transmitting characteristics of the colorant-based color polarizer are shown in FIG. 6 of a literature "Proceedings of the SID" Vol. 26/2 (1985), 157–161.

As apparent from FIG. 6 of the literature quoted above, curves of the transmittance characteristics are sharp and the dichroic ratio is sufficient in the red polarizer and the yellow polarizer. However, the characteristics of the blue polarizer and the cyan polarizer are markedly inferior. Therefore, where a liquid crystal color shutter is formed by using these colorant-series color polarizers, the transmittance is markedly lowered.

Under the circumstances, a PRS (Polarizer Retarder Stack) is proposed in recent years by Sharp et al. as a color polarizer performing the function similar to that performed by a dichroic color polarizer and used in a liquid crystal color shutter in place of the dichroic color polarizer (U.S. Pat. No. 5,751,384). The PRS is formed by laminating a plurality of birefringent retardation films (i.e., at least about 5 films) on an achromatic polarizer in a phase axis direction of a predetermined angle.

By setting the retardation and the phase axis direction of the birefringent retardation film appropriately in the PRS, it is possible to allow the white light incident on the side of the achromatic polarizer to be emitted from the polarizer at different angles relative to the optical axis of the achromatic polarizer depending on the wavelength region of the light, as shown in FIG. 2. For example, the light having the wavelength region of blue is emitted at 0° and the light having wavelength regions of green and red (yellow) is emitted at 90° relative to the optical axis of the achromatic polarizer. It follows that this example is equal to the case where dichroic colorant polarizers of blue and yellow are arranged such that the absorption axes of these two polarizers are perpendicular to each other. The PRS does not include an absorption medium other than the absorption axis of the achromatic polarizer and, thus, has a high transmittance, compared with the dichroic colorant polarizer.

The liquid crystal color shutter employs the system that the transmitting color is switched by controlling the polarizing plane of the incident light. Therefore, where an unpolarized natural light is assumed to be the incident light, one polarized component is absorbed during conversion from the unpolarized light into a polarized light. Thus, the liquid crystal color shutter is essentially lower in its transmittance than the color filter. Naturally, it is important to improve the transmittance of the liquid crystal color shutter.

The optical characteristics of the color polarizer constituting the liquid crystal shutter greatly affects the transmittance of the liquid crystal color shutter. When it comes to the two color polarizers of the dichroic colorant polarizer and the PRS, the PRS system is advantageous in transmittance because the absorbing member is not included in the members other than the achromatic polarizer. On the other hand, in the PRS system, the incident light is separated into mutually complementary colors such as blue/yellow or cyan/red in the axes of the polarized light perpendicular to each other. It follows that it is impossible to cut the undesired light, with the result that the component of the intermediate wavelength region in the boundary region between blue and green and between green and red is allowed to be contained in any of the color display of the RGB displays. Such being the situation, it is difficult to improve the color purity in all of RGB colors.

As an example specifically showing the above-noted problem, the construction of the conventional liquid crystal color shutter using PRS, the transmittance characteristics at each PRS, and the RGB color reproducing region in the CIE1976UCS chromaticity diagram are shown in FIGS. 3 to 9.

Specifically, FIG. 3 shows as an example the construction of a LCCS (liquid crystal color shutter) using PRS. Polarizing rotators 103, 104 consisting of liquid crystal cells are inserted between achromatic polarizers 105 and 106 and between the polarizers 106 and 107, respectively. By controlling the voltage applied to each of these polarizing rotators 103 and 104, it is possible to select in a binary fashion the transmission/90° rotation of the polarizer, making it possible to give four kinds of polarized states to the incident light. Further, birefringent retardation films 108 and 109 are inserted such that the achromatic polarizer 105 and the birefringent retardation film 108 constitute a PRS structure. Likewise, the achromatic polarizer 106 and the birefringent retardation film 109 constitute another PRS structure.

FIG. 4 shows the relationship between the transmittance and the wavelength with respect to the polarized component of the light passing through the achromatic polarizer 105 and the birefringent retardation film layer 108, said polarized component having axes of polarization in the directions of a transmission axix and an absorption axis of the achromatic polarizer 105. The birefringent retardation film 108 is of a five-layer structure, each layer having a retardation value of 600 nm and the directions of the fast axes of these five layers being arranged at 45°/–15°/–15°/10°/10° relative to the transmission axis of the achromatic polarizer 105. As apparent from FIG. 4, a color polarizer of yellow/blue is formed in this PRS structure.

On the other hand, FIG. 5 shows the relationship between the transmittance and the wavelength with respect to the polarized light component of the light passing through the achromatic polarizer 106 and the birefringent retardation film layer 109, said polarized light component having axes of polarization in the directions of a transmission axis and an absorption axis of the achromatic polarizer. The birefringent retardation film layer 109 is of a six-layer structure, each layer having a retardation value of 643 nm, and the directions of the fast axes being arranged at 8.3°/18°/18°/–3.7°/–45°/–78° relative to the transmission axis of the achromatic polarizer 106. As apparent from FIG. 5, a red/cyan color polarizer is formed in this PRS structure.

By the combination of these two kinds of the PRS structures and the achromatic polarizer 107, the RGB transmission characteristics obtained by the voltage control of the liquid crystal cells 103 and 104 are represented by 3001 (blue), 3002 (green) and 3003 (red) as shown in FIG. 6.

Suppose an image display apparatus of a field-sequential color mixing display is formed by arranging the liquid crystal color shutter described above on the front surface of a monochromatic CRT. In this case, the color reproducing region calculated in view of the emission spectrum of a standard phosphor P22 for a TV used as a light source is as shown in FIG. 7. Incidentally, the emission spectrum of P22 is denoted in FIG. 6 by a reference numeral 704.

In the CIE1976UCS chromaticity diagram shown in FIG. 7, the RGB color reproducing region in the ordinary CRT, in which the RGB display was performed by the spatial color mixing display, is represented by the reference numeral 801. On the other hand, the RGB color reproducing region by the conventional construction as shown in FIG. 3 is represented by reference numeral 3101. As apparent from FIG. 7, the RGB color reproducing region 3101 in the conventional structure as shown in FIG. 3 is insufficient in the chroma of red and blue, compared with the RGB color reproducing region 801 in the ordinary CRT.

It is possible to shift the transmittance characteristics shown in FIGS. 4 and 5 by changing the retardation values of the two kinds of PRS structures. However, if the chroma of each of red and blue is improved, the chroma of green is lowered. In other words, the color purity of each of RGB bears a trade-off relationship.

Even where the phosphor for CRT is changed into a three wavelength type as another example, the chroma of blue is certainly improved if the RGB color reproducing properties are similarly calculated on the assumption of the typical P45 phosphor (FIG. 28, 904). However, the chroma of red becomes greatly deficient as denoted by the reference numeral 3301 in FIG. 9.

On the other hand, in order to improve the color purity by absorbing the light component having an intermediate wavelength region, Sharp et al. have proposed a system in which a pre-filter, i.e., an achromatic polarizer and a plurality of birefringent retardation films, is added to a light shutter based on the PRS system (FIGS. 38 and 39 of U.S. Pat. No. 5,929,946).

In this system, however, it is difficult to control independently the absorption wavelength region and the absorption profile in the intermediate wavelength regions between blue and green and between green and red. Also, the addition of the achromatic polarizer and the birefringent retardation films makes the construction and the manufacturing process complex and causes reduction in the transmittance because of the transmission loss of the films.

As described above, it is necessary to improve the color purity of the RGB displayed colors while improving the transmittance in the liquid crystal color shutter. In the constructions proposed to date, however, there were some merits and some demerits simultaneously, making it difficult to satisfy these two requirements simultaneously.

BRIEF SUMMARY OF THE INVENTION

An object of the present invention is to provide a color shutter that permits improving the color purity of each of RGB displayed colors while improving the transmittance.

Another object of the present invention is to provide a color image display apparatus provided with a color shutter of the present invention.

According to a first aspect of the present invention, there is provided a color shutter, comprising first, second and third polarizers polarizing the incident light over the entire region of the visible wavelengths and arranged in the order mentioned as viewed from the side of the incident light; first and second retarders each having a plurality of birefringent layers; first and second polarizing rotators changing the angle of rotation of the polarizing plane by application of a voltage over the entire region of the visible wavelengths of the incident light; and at least one absorption type partial polarizer converting the incident light into a polarized light by absorbing a part of the wavelength regions of the incident light, wherein the first retarder is arranged between the first polarizer and the second polarizer; the second retarder is arranged between the second polarizer and the third polarizer; the first polarizing rotator is arranged between the first polarizer and the second polarizer; the second polarizing rotator is arranged between the second polarizer and the third polarizer; at least one of the first polarizing rotator and the second polarizing rotator is arranged in a manner to be sandwiched between the second polarizer and the first or second retarder; the absorption type partial polarizer is arranged between the first polarizing rotator and the first retarder and/or between the second polarizing rotator and the second retarder; and the transmitted light can be changed into the three primary colors of RGB by selecting the voltage applied to the first and second polarizing rotators.

According to a second aspect of the present invention, there is provided a color image display apparatus, comprising an image display mechanism displaying a monochromatic two dimensional image, and the color shutter of the present invention arranged on the front surface of the display screen of the image display mechanism, wherein the image display mechanism sequentially displays a monochromatic image for the three primary colors of RGB, and the transmitted color of the color shutter can be switched in synchronization with the image display.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
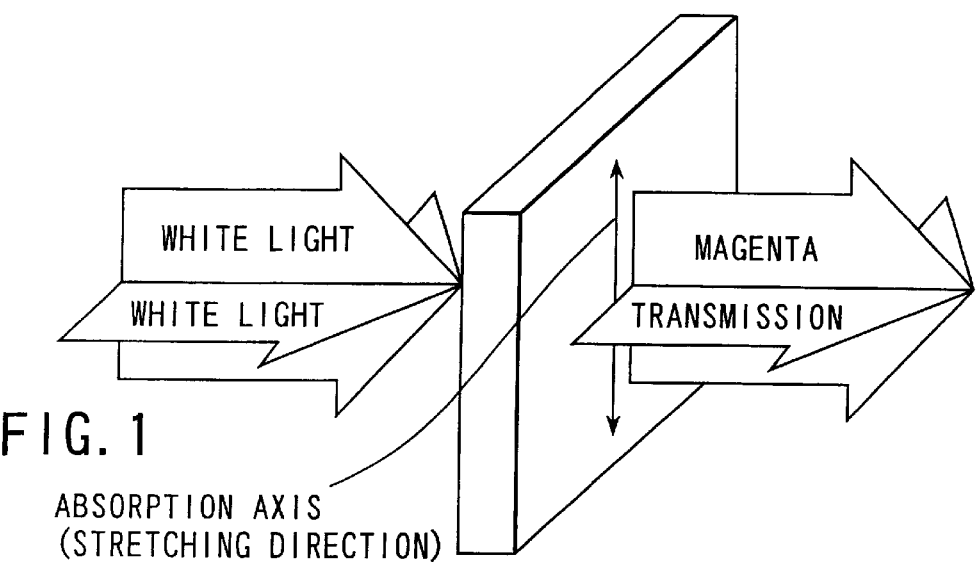
FIG. 1 schematically shows the transmission characteristics of a dichroic colorant polarizer.
Figure 2:
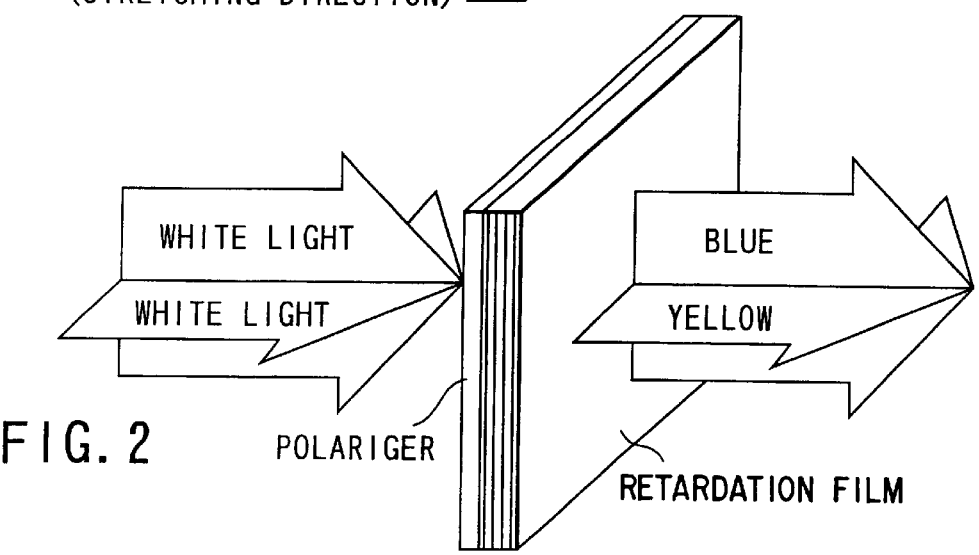
FIG. 2 schematically shows the transmission characteristics of PRS.
Figure 3:
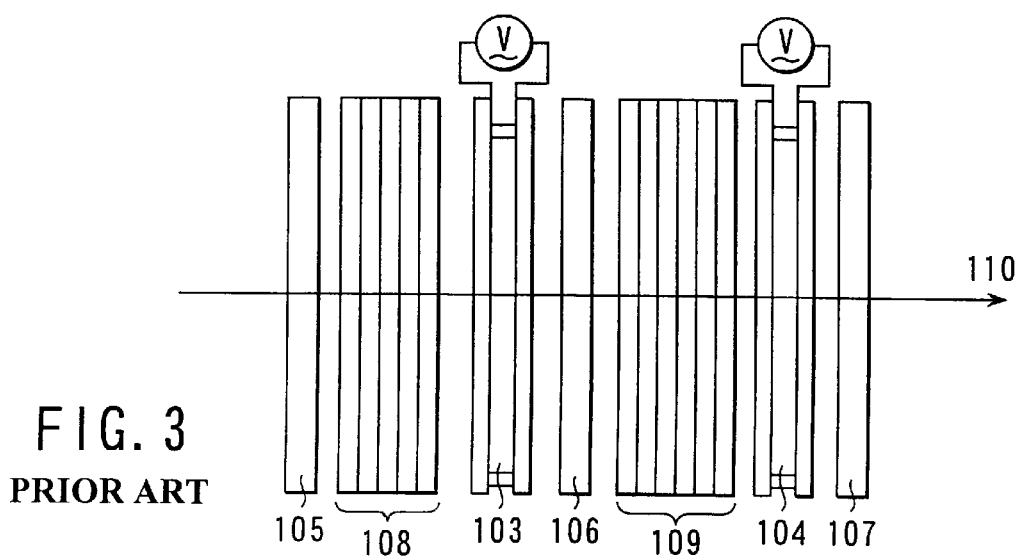
FIG. 3 shows the construction of the conventional color shutter.
Figure 4:
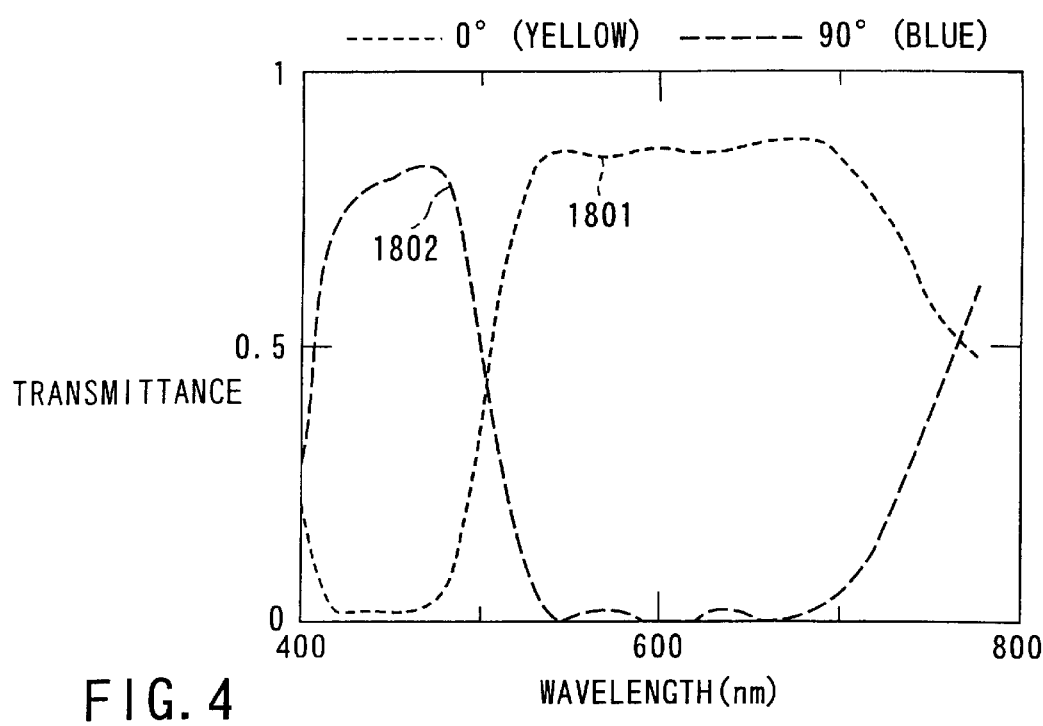
FIG. 4 is a graph showing the spectral transmittance characteristics obtained by the first full wavelength polarizer and the first retarder in the conventional color shutter.
Figure 5:
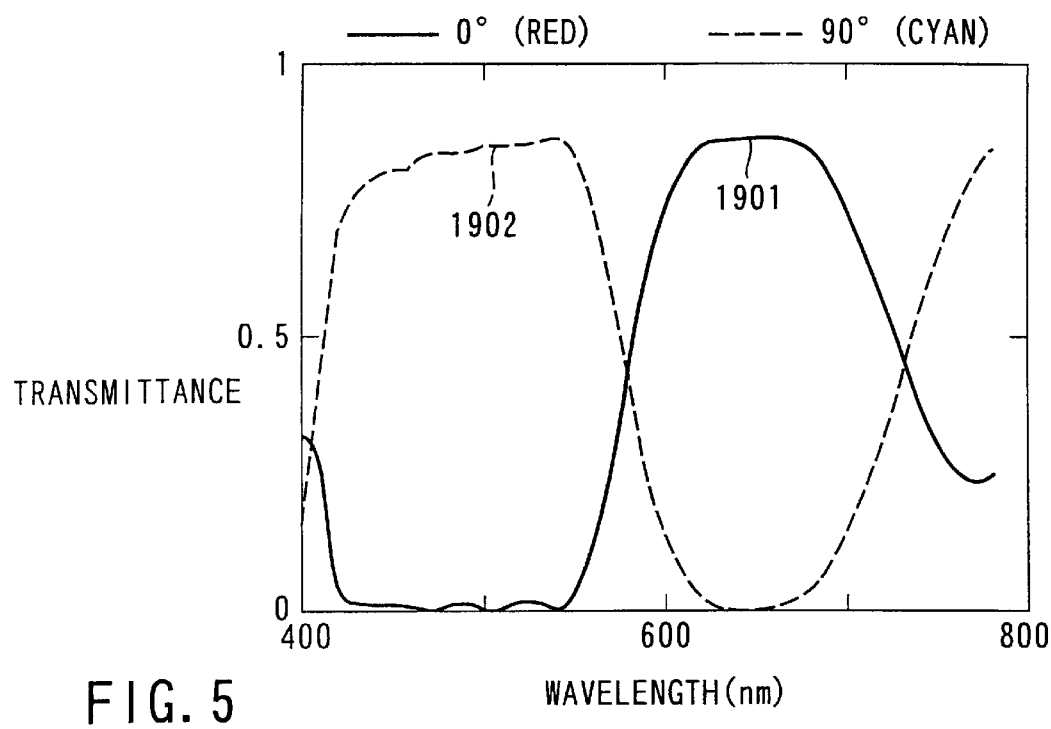
FIG. 5 is a graph showing the spectral transmittance characteristics obtained by the second full wavelength polarizer and the second retarder in the conventional color shutter.
Figure 6:
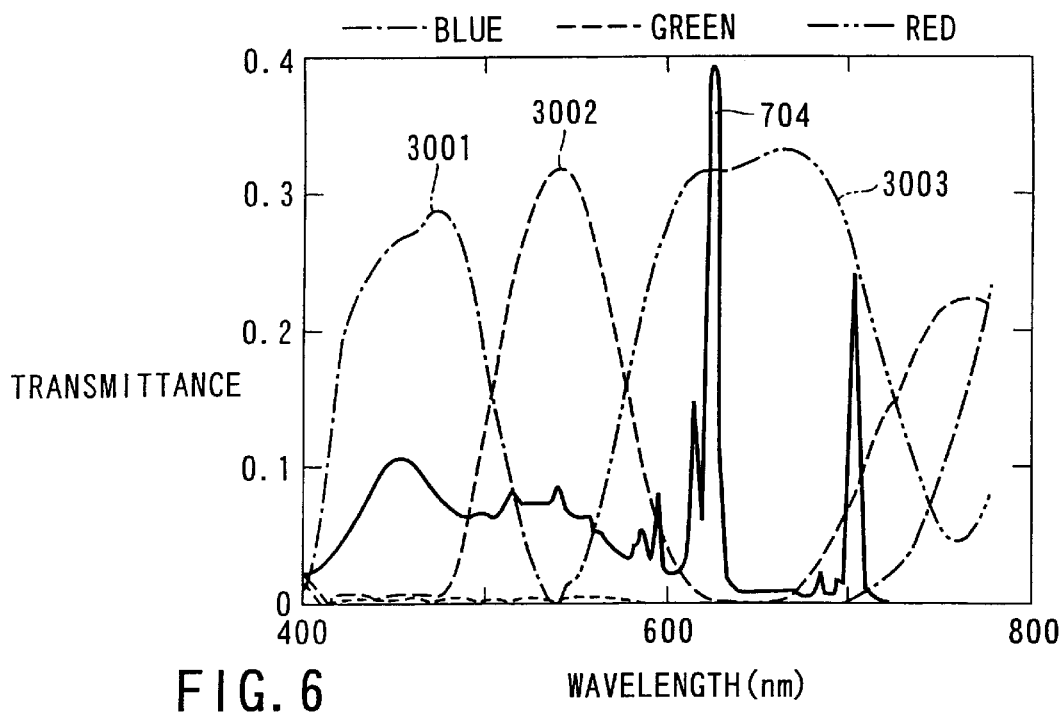
FIG. 6 is a graph showing the RGB spectral transmittance characteristics and the P22 phosphor emission spectrum obtained in the conventional color shutter.

The color shutter of the present invention comprises at least three polarizers of the full wavelength type, i.e., achromatic polarizers, and is constructed such that a retarder consisting of at least two sets of a plurality of birefringent retardation films is inserted between adjacent achromatic polarizers, a polarizing rotator capable of controlling the polarizing plane at 0° (transmission)/90° rotation, mainly a liquid crystal cell, is interposed between adjacent achromatic polarizers such that at least one set of the retarder is positioned on the outside of the liquid crystal cell, and at least one absorption type partial polarizer, mainly a dichroic colorant type colored polarizer, is inserted between the retarder and the polarizing rotator.

It is possible to construct the color shutter of the present invention such that the transmitted spectrum of the first polarization axis among the first and second polarization axes perpendicular to each other on the light emitting plane of the first retarder constitutes one of the three primary colors in the additive color mixing display, that the transmitted spectrum of the second polarization axis constitutes a complementary color of the wavelength spectrum transmitted through the first polarization axis, that the transmitted spectrum of the third polarization axis among the third and fourth polarization axes perpendicular to each other on the light-emitting plane of the second retarder constitutes one of the three primary colors in the additive color mixing display, which differs from the color of the polarized light transmitted through the first polarization axis in the light-emitting plane of the first retarder, that the transmitted spectrum of the fourth polarization axis constitutes a complementary color of the wavelength spectrum transmitted through the third polarization axis, and that the absorption axis of the absorption type partial polarizer extends in a direction substantially conforming with the extending direction of the polarization axis of the retarder.

To be more specific, it is possible to use a chromatic polarizer containing a dichroic colorant as the absorption type partial polarizer and to use the first and second retarders as the birefringent retardation film.

Also, it is desirable for the absorption axis in the absorption type partial polarizer to exhibit characteristics of absorbing the region on the side of the short wavelength in the visible wavelength range and for its absorption edge to be present on the side of the long wavelength compared with the wavelength region of the transmitted wavelength spectrum in the polarization axis substantially conforming with the absorption axis with respect to the first polarizer and the first retarder or with respect to the second polarizer and the second retarder.

Incidentally, it is desirable for the polarizing rotator to consist of a liquid crystal cell having a retardation falling within a range of between 200 nm and 350 nm and a response time not longer than 1.5 ms. It is also desirable for the rotation angle of the polarized plane of the incident light to be switched between 0° (180°) and 90°.

It is possible to use a PBS (polarized beam splitter) or a circular polarizer, i.e., a linear polarizer prepared by adding ¼ wavelength plate to, for example, a cholesteric liquid crystal, as an full wavelength type polarizer, i.e., an achromatic polarizer, in addition to an iodine type or a dichroic colorant series absorption type polarizer that is generally used in an LCD (liquid crystal display element).

In general, a PC (polycarbonate) having an stretching treatment applied thereto in general is used as a birefringent retardation film included in the retarder. In addition, it is also possible to use a film optically transparent and exhibiting birefringence properties such as a film of PVA (polyvinyl alcohol), a film of PSF (polysulfone), or a film of PMMA (polymethyl methacrylate). It is also possible to use a birefringence optical crystal such as $SiO_2$ or $LiNbO_3$.

At least three layers are laminated one upon the other for each set of the retarder, and all of these layers assume the same value of retardation in principle. Needless to say, however, it is possible for the fast axes of two of these layers to extend in the same direction depending on the combination and, thus, it is possible to substitute a layer having twice the value of retardation for these two layers.

In general, a uniaxial retardation film is used as the birefringent retardation structure. However, it is desirable to use a biaxial retardation film because it is possible to diminish the change in retardation with respect to an obliquely incident light. To be more specific, it is possible to markedly widen the range of viewing angle giving characteristics substantially equal to those in the vertical direction by using a biaxial retardation film having the retardation compensated appropriately.

Concerning the appropriate conditions of the biaxial retardation film, it is desirable for the inplane refractive index $n_x$, $n_y$, i.e., $\Delta n = n_x - n_y$, and the refractive index $n_z$ in the thickness direction to meet the relationship: $n_z = (n_x + n_y)/2$.

Two sets of color polarizers are formed by each set of at least two sets of retarders each consisting of a plurality of layers and a full wavelength polarizer arranged in the front stage or rear stage of the retarder. Where the full wavelength polarizer is arranged in the front stage in each color polarizer, the emitted transmitted light relative to the incident white light is any of the combinations that permit the polarization axes perpendicular to each other to form a polarized light having a color of red/cyan, green/magenta or blue/yellow. In addition, it is important to set the two sets of color polarizers in different combinations, e.g., blue/yellow for the front stage and red/cyan for the rear stage.

The transmitted spectrum in these polarization axes can be adjusted by the combination of the polarization axis of the full wavelength polarizer and the direction of the fast axis of the retarder as well as by the retardation of the retarder.

Where the full wavelength polarizer is arranged on the rear stage of the retarder, the emitted transmitted color is made to form the above-noted combination by selecting appropriately the combinations of the incident polarization angles perpendicular to each other and by selecting any one of the incident polarization angles. Incidentally, the polarization main axes perpendicular to each other on the side of the retarder does not necessarily conform with the transmission axis and the absorption axis of the full wavelength polarizer.

In general, a liquid crystal cell can be used as the polarizing rotator. In addition, it is also possible to use a nonlinear optical crystal such as PLIZT as the polarizing rotator.

It is possible to use the liquid crystal cell in the operation mode of TN (twisted nematic), STN (super twisted nematic), PI twist cell, OCB (Optically Compensated Birefringence), etc. by using a nematic liquid crystal material. It is also possible to use the liquid crystal cell in the operation mode of SSFLC (Super Stabilized Ferroelectric Liquid Crystal), DHF (Deformed Helix Ferroelectric liquid crystal), AFLC (Anti-Ferroelectric Liquid Crystal) or TLAF (Threshold-Less Anti-Ferroelectric liquid crystal) by using a smectic liquid crystal material.

It suffices for the polarizing rotator to be capable of selecting whether to rotate the incident polarizing plane by 90° by means of voltage application or by any means replacing the voltage application. It is desirable for the polarizing rotator to be capable of uniformly rotating the polarizing plane over the entire visible light range. It is also important for the response time to be short. In terms of the response time, it is desirable to use a PI twist cell, (SS)FLC, AFLC, TLAF, etc. These liquid crystal cells permit the switching within 1.5 ms.

The rotating mechanism of the polarizing plane should be under ½ wavelength condition, i.e., retardation should be set at 200 to 350 nm, preferably 250 to 280 nm, and the phase axis of the rotating mechanism should make 45° relative to the incident light main axis. When it comes to the nematic liquid crystal cell, an AC voltage is not applied or applied so as to permit transmission by rotation by 90° of the polarizing plane and the disappearance of the phase difference. Also, when it comes to the smectic series liquid crystal cell, the phase axis can be rotated by 45° by the polarity selection of the applied voltage so as to perform similarly 90° rotation/0° rotation.

As a means for compensating the wavelength dispersion described previously, it is effective to optimize the $\Delta$nd wavelength dispersion of the liquid crystal layer or to use a birefringent retardation film for the compensation. It is also possible to incorporate the birefringent retardation film in the retarder consisting of a plurality of layers.

As an absorption type partial polarizer, it is possible to use a chromatic polarizer containing the dichroic dye. In general, the chromatic polarizer containing a dichroic dye is prepared by allowing a PVA material used as a base material to contain a dichroic dye, followed by stretching the PVA base material so as to achieve orientation and to impart dichroic properties of absorption/transmission. In the present invention, it is possible to use a chromatic polarizer of any color. In general, it is desirable to use the so-called yellow polarizer, red polarizer, magenta polarizer, etc., which are satisfactory in their dichroic ratio, as the chromatic polarizer.

As a dichroic dye exhibiting these colors, it is possible to use CI-direct yellow 12, CI-direct yellow 44 for the yellow polarizer, and CI-direct red 81, CI-direct red 83, etc. for the red or magenta series polarizer. It is also possible to use an azo series colorant, an anthraquinone series colorant and cumarin series colorant as the colorant skeleton. Further, it is possible to mix appropriately various colorants.

It is necessary for the absorption axis of the chromatic polarizer to be roughly coincident with one of the polarizing main axes of the adjacent retarders. Also, in this case, it is necessary for the direction of the absorption axis of the color polarizer to be roughly coincident with the hue of the transmitted wavelength spectrum of the coincident polarizing main axis.

For example, in the case of using a yellow chromatic polarizer, the transmitted spectrum given by the adjacent retarder and the full wavelength polarizer is blue/yellow, and the absorption axis must be roughly coincident with the direction of yellow. Further, it is desirable for the cut off wavelength $\lambda_1$ in the wavelength spectrum of yellow given by the adjacent retarder and the full wavelength polarizer and the cut off wavelength $\lambda_2$ of yellow in the absorption axis of the chromatic polarizer to meet the relationship: $\lambda_1 < \lambda_2$.

On the other hand, in the case of a red (magenta) series chromatic polarizer, it is desirable for the transmitted spectrum given by the adjacent retarder and the full wavelength polarizer to be a combination of red/cyan and for the similarly defined cut-off wavelength to meet the relationship of $\lambda_1 > \lambda_2$.

It is possible to use the color shutter of the present invention, which is constructed as described above, in combination with an imaging means for displaying a monochromatic two dimensional image, e.g., a monochromatic CRT (cathode ray tube). To be more specific, it is possible to arrange the imaging means such that the observer is sandwiched between the color shutter and the imaging means, and the two sets of the polarizing rotators are rotated in synchronization with the image display so as to achieve a color image display by the field-sequential additive color mixing.

It is possible to use a monochromatic light emitting type image display device or the like as the monochromatic image display means. Specifically, in addition to CRT, it is also possible to use FED (Field Emission Display), PDP (Plasma Display Panel), inorganic/organic EL (Electro Luminescence) display, TFT-LCD (Thin Film Transistor-Liquid Crystal Display), etc. as the monochromatic image display means.

Also, these devices can be used not only as a direct vision type image display device but also as a projection type display device. In addition, it is effective to use these devices in a single plate reflection type projector using a DMD (digital micro mirror device).

What is required for these image display devices is a high brightness and a high resolution. In addition, it is required for the light emission attenuating time or the response time to be short. For example, where the RGB sub-field is displayed in 1 frame period 1/60 s, the display corresponds to a triple speed display, and each sub-field period is 5.5 ms. It follows that the transmitted color of the color shutter is selected and the image corresponding to the displayed color of the image display device on the back surface is finished after the response within the sub-field period noted above.

In order to perform the above-noted display operation smoothly, it is desirable to divide the image plane of the polarizing rotator in the color shutter into a plurality of regions in a vertical direction on the image plane so as to perform the scroll operation by sequentially delaying the phases of the applied voltage.

Various Examples of the present invention will now be described. Needless to say, however, the present invention is not limited to these Examples. These Examples can be employed in various combinations. Also, these Examples can be altered and modified in various fashions.

EXAMPLE 1

Figure 10:
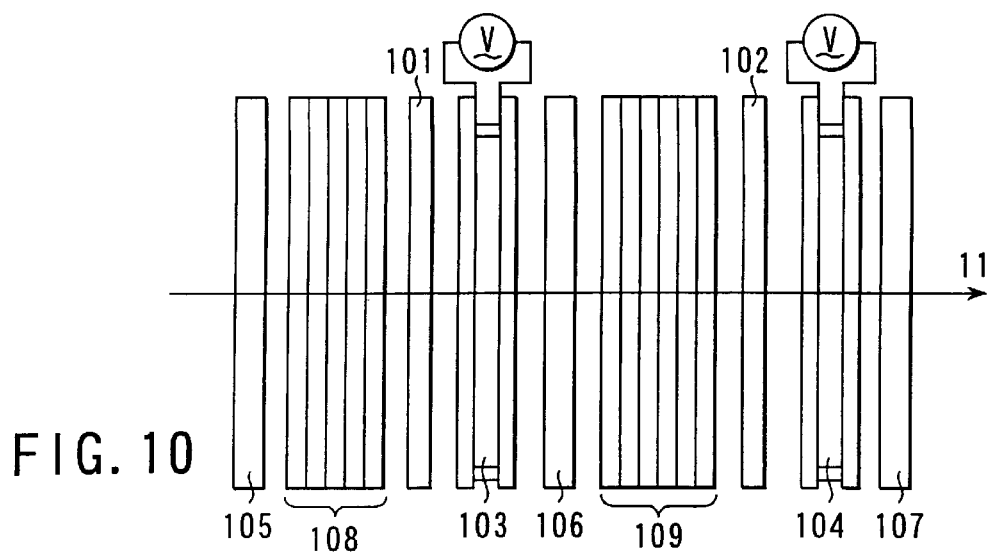
FIG. 10 shows the construction of a color shutter according to a first embodiment of the present invention.

FIG. 10 schematically shows the construction of a color shutter according to a first embodiment of the present invention. As shown in the drawing, three achromatic polarizers 105, 106, 107, which are polarizers for the full wavelength, are arranged apart from each other. Arranged between the adjacent achromatic polarizers 105 and 106 are a retarder 108 of a five-layer structure, a yellow polarizer 101, which is an absorption type partial polarizer containing a dichroic colorant, and an antiferroelectric liquid crystal cell 103 acting as a polarizing rotator. On the other hand, arranged between the adjacent achromatic polarizers 1066 and 107 are a retarder 109 of a five-layer structure, a magenta polarizer 102, which is an absorption type partial polarizer containing a dichroic colorant, and an antiferroelectric liquid crystal cell 104 acting as a polarizing rotator.

Figure 11:
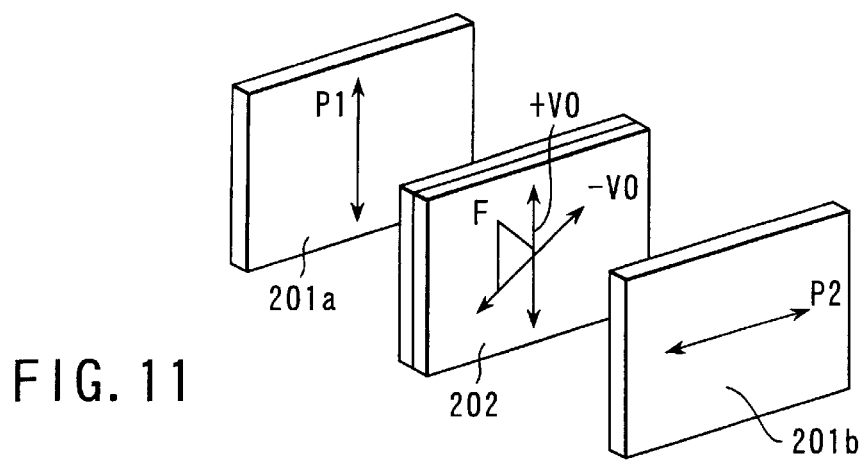
FIG. 11 shows the polarizing plane rotating method of an antiferroelectric liquid crystal cell constituting a polarizing rotator in the first embodiment of the present invention.

FIG. 11 schematically shows the optical arrangement of the antiferroelectric liquid crystal cells 103 and 104. On the other hand, FIG. 12 schematically shows the driving sequence of the polarizing rotators of the antiferroelectric liquid crystal cells 103 and 104.

For the sake of brevity of description, FIG. 11 covers the case where a pair of achromatic polarizers 201a, 201b are arranged to have an antiferroelectric liquid crystal cell 202 (103, 104) sandwiched therebetween. The symbols P1 and P2 in the drawing represent the polarized light transmission axes of the achromatic polarizers 201a and 201b, respectively, with F representing the fast axis of the antiferroelectric liquid crystal cell 202.

The retardation of the liquid crystal cell 202, which is not particularly shown in the drawing, is 250 nm, which meets the ½ wavelength condition relative to the light having a wavelength of 500 nm. If the azimuth angles of the polarized light transmitting axes P1 and P2, which are perpendicular to each other, are supposed to be 90°/0°, the angle of inclination of the fast axis F of the antiferroelectric liquid crystal cell 202 is 90° in the case of applying a negative voltage $-V_0$, and is 45° in the case of applying a positive voltage $+V_0$.

Figure 12:
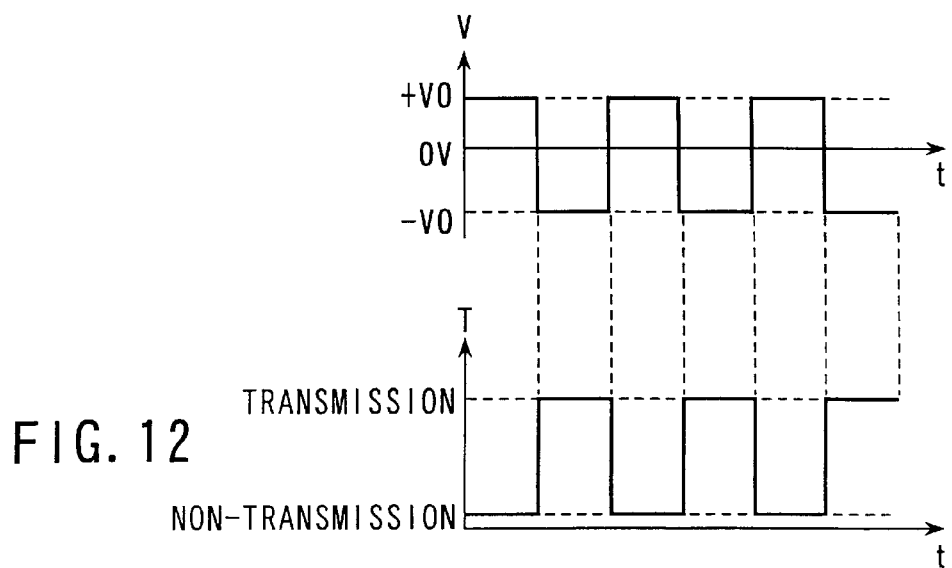
FIG. 12 shows the polarizing plane rotating method of an antiferroelectric liquid crystal cell constituting a polarizing rotator in the first embodiment of the present invention.

In the arrangement described above, the DC component of the applied signal is canceled by applying a voltage $\pm V_0$ having the same absolute value, the polarity of which is periodically changed, to the antiferroelectric liquid crystal 202 for the same period as shown in FIG. 12, making it possible to perform the operation without bringing about baking.

It should be noted that, where a negative voltage $-V_0$ is applied to the antiferroelectric liquid crystal cell 202, the polarizing plane of the linear polarized light transmitted through the achromatic polarizer 201a having the polarized light transmitting axis P1 so as to be incident on the antiferroelectric liquid crystal cell 202 is rotated by 90° within the antiferroelectric liquid crystal cell 202. As a result, the polarized light passing through the antiferroelectric liquid crystal cell 202 is transmitted through the polarizer 201b on the emitting side having the polarized light transmission axis P2 so as to form a "bright" state. On the other hand, when a positive voltage $+V_0$ is applied to the antiferroelectric liquid crystal cell 202, the polarizing plane is not rotated so as to form a "dark" state.

As described above, in the construction comprising a pair of achromatic polarizers 201a, 201b arranged in crossed Nicols and the antiferroelectric liquid crystal cell 202 sandwiched therebetween, the switching between "bright" and "dark" can be achieved by selecting the polarity of the voltage applied to the antiferroelectric liquid crystal cell 202. It should be noted that the bright/dark switching is performed in this case because the polarizers 201a, 201b are achromatic polarizers. However, it is also possible to change the color of the transmitted light by using a partial polarizer as at least one of these polarizers.

In this embodiment, four sets of polarizing conditions can be selected by shifting the phase of the wave form of the voltage applied to the two antiferroelectric liquid crystal cells 103 and 104.

Table 1 shows the polarization axes and directions of each of the optical members constituting this embodiment. Concerning the polarization axis of each of the optical members, the achromatic polarizer is denoted by the transmission axis, the birefringent retardation film and the antiferroelectric liquid crystal cell are denoted by the fast axis, and the dichroic colorant polarizer is denoted by the absorption axis. Incidentally, the first birefringent retardation film layer 108 is of 5-layer structure, each retardation value is 560 nm, the second birefringent retardation film layer 109 is of 6-layer structure, and each retardation value is 643 nm.

TABLE 1

|  | Kind | Polarizing axis | Direction |
|---|---|---|---|
| 105 | N polarizer | Transmission axis | 0° |
| 108 | Retardation film 1 | Fast axis | 10° |
| 560 nm | Retardation film 2 | Fast axis | 10° |
|  | Retardation film 3 | Fast axis | −15° |
|  | Retardation film 4 | Fast axis | −15° |
|  | Retardation film 5 | Fast axis | 45° |
| 101 | Y polarizer | Absorption axis | 0° |
| 103 | Liquid crystal cell | Fast axis | 45°/90° |
| 106 | N polarizer | Absorption axis | 10° |
| 109 | Retardation film 1 | Fast axis | 8.3° |
| 643 nm | Retardation film 2 | Fast axis | 18° |
|  | Retardation film 3 | Fast axis | 18° |
|  | Retardation film 4 | Fast axis | −3.7° |
|  | Retardation film 5 | Fast axis | −45° |
|  | Retardation film 6 | Fast axis | −78° |
| 102 | M polarizer | Absorption axis | 0° |
| 104 | Liquid crystal cell | Fast axis | 45°/90° |
| 107 | N polarizer | Transmission axis | 0° |

Figure 13:
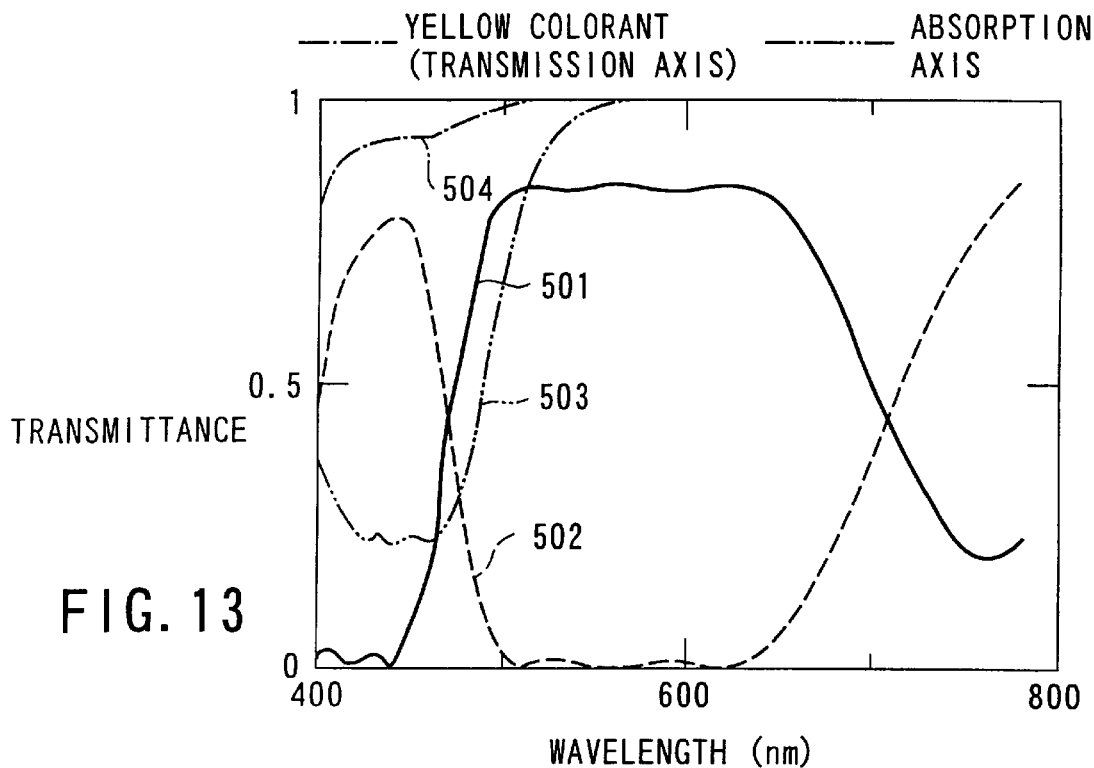
FIG. 13 is a graph showing the spectral transmittance characteristics obtained by the first full wavelength polarizer and the first retarder and the spectral transmittance characteristics of the first partial polarizer in the first embodiment of the present invention.

A yellow/blue color polarizer is formed by the first achromatic polarizer 105 and the first birefringent retardation film layer 108. FIG. 13 shows the spectral transmittance at each of the polarizing main axis. If the polarizing main axis on the light emitting plane of the birefringent retardation film layer 108 is taken in the direction of 0°, 90°, curve 501 represents the spectral transmittance curve of the emitted linear polarized light in the direction of 0°, which exhibits a yellow color.

On the other hand, curve 502 represents the spectral transmittance curve of the emitted linear polarized light in the direction of 90°, which exhibits a blue color that is complementary to the spectral transmittance curve 501. In addition, since the yellow polarizer 101, which is a partial polarizer, is arranged in the absorption axis direction of 0°, the spectral transmittance of light transmitted through the achromatic polarizer 105, the birefringent retardation film layer 108, and the yellow polarizer 101 becomes the spectral transmittance (yellow) obtained by the multiplication of the curves 501 and 503 in the direction of 0° and also becomes the spectral transmittance (blue) obtained by the multiplication of the curves 502 and 504 in the direction of 90° in FIG. 13.

It should be noted that the absorption edge of the spectral transmittance curve 503 on the side of the absorption axis of the yellow polarizer 101 is positioned on the side of the long wavelength, compared with the spectral transmittance curve 501. As a result, the synthesized yellow transmittance spectrum is greatly affected by the spectral transmittance curve 503 of the yellow polarizer 101.

On the other hand, since the spectral transmittance in the direction of 90° is synthesized by the transmitting axis spectral transmittance curve 504 of the yellow polarizer 101 and the spectral transmittance curve 502, the curve is close to the spectral transmittance curve 502 for blue.

Figure 14:
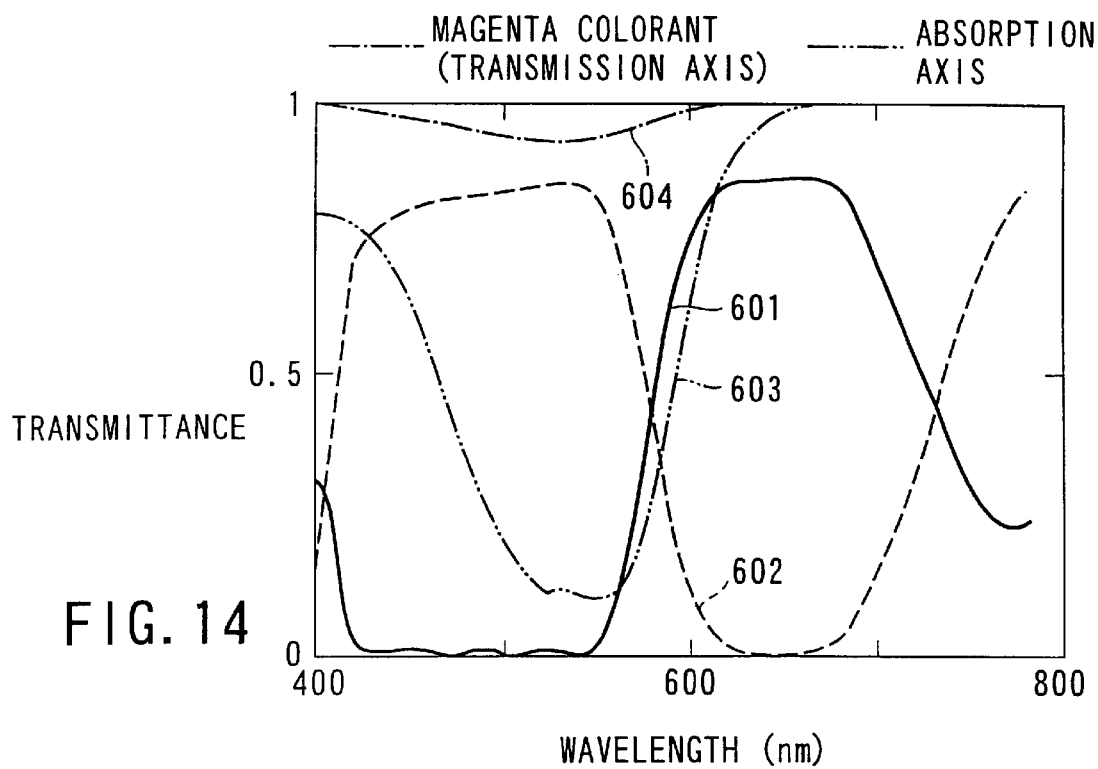
FIG. 14 is a graph showing the spectral transmittance characteristics obtained by the second full wavelength polarizer and the second retarder and the spectral transmittance characteristics of the second partial polarizer in the first embodiment of the present invention.

It should be noted that a red/cyan color polarizer is formed by the second achromatic polarizer 106 and the second birefringent retardation film layer 109. FIG. 14 shows the spectral transmittance curves of the polarized light main axes. In FIG. 14, the spectral transmittance curve of the emitted linear polarized light in the direction of 0° is represented by a red transmission curve 601, and the spectral transmittance curve of the emitted linear polarized light in the direction of 90° is represented by a cyan transmission curve 602. The partial polarizer 102 arranged in the rear stage is a magenta polarizer, and the absorption edge is in the direction of 0° as in the red transmission curve 601 noted above.

The spectral transmittance of the magenta polarizer is represented by a curve 603 on the side of the absorption axis and by a curve 604 on the side of the transmission axis. By the combination of these curves 603 and 604, the spectral transmittance in the direction of 0° is greatly affected by the spectral transmittance curve 603 in the magenta polarizer 102 in the cut-off of about 600 nm so as to exhibit the spectral transmission characteristics exhibiting a red color. On the other hand, the spectral transmittance in the direction of 90° exhibits the spectral transmission characteristics of a cyan color, which is close to the cyan transmission curve 602.

The second antiferroelectric liquid crystal cell 104 and the achromatic polarizer 107 are arranged in the rear stage of the red/cyan color polarizer so as to select the displayed color of the color shutter.

Table 2 shows the relationship between the polarity of the voltage applied to the antiferroelectric liquid crystal cells 103 and 104 acting as a polarizing rotator and the displayed color. Where the light is transmitted without rotating the polarizing plane while applying a positive voltage $+v_0$ to the two antiferroelectric liquid crystal cells 103 and 104, the synthesized curve obtained by synthesizing the yellow wavelength curve transmitted in the direction of 0° in the first achromatic polarizer 105, the first birefringent retardation film layer 108 and the yellow polarizer 101, and the red wavelength curve transmitted in the direction of 0° in the second achromatic polarizer 106, the second birefringent retardation film layer 109 and the magenta polarizer 102, i.e., a red transmission curve, is detected by the third achromatic polarizer 107 so as to perform the red display.

Figure 15:
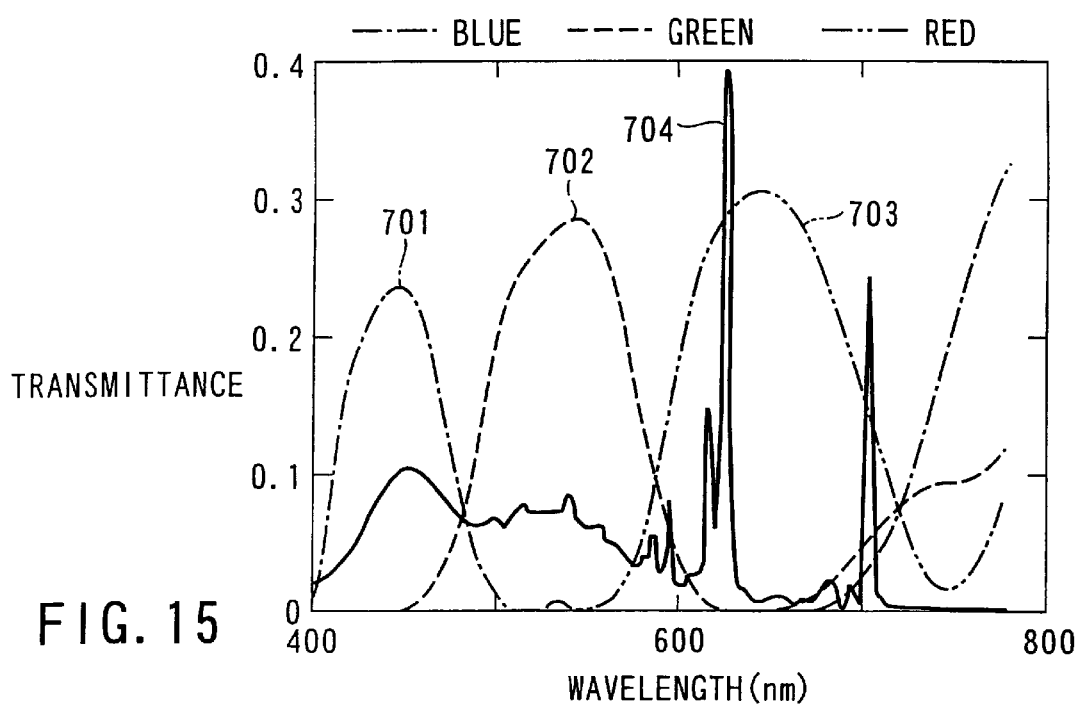
FIG. 15 is a graph showing the RGB spectral transmittance characteristics and P22 phosphor emission spectrum obtained in the first embodiment of the present invention.

Table 2 shows the polarities of the voltage applied to the liquid crystal cells 103 and 104 for each of the RGB display, and FIG. 15 shows the transmittance characteristics of the transmitted wavelength. The blue display is denoted by a curve 701, the green display is denoted by a curve 702, and the red display is denoted by a curve 703 in FIG. 15.

TABLE 2

|  | Red | Green | Blue |
|---|---|---|---|
| 103 | $+V_0$ | $-V_0$ | $-V_0$ |
| 104 | $+V_0$ | $+V_0$ | $-V_0$ |

Each of FIGS. 13 and 14 shows the transmittance relative to the incident linear polarized light. On the other hand, the transmittance relative to the incident light, which is not polarized, is shown in FIG. 15. These definitions are the same in respect of the Figures referred to herein later.

Let us consider the color reproducing region covering the case where a monochromatic CRT is combined with the color shutter in this embodiment so as to carry out the color image display by the field-sequential additive color mixing. In general, phosphor P22 is used in the CRT. FIG. 15 shows the emission spectrum of the phosphor P22 (curve 704).

Figure 16:
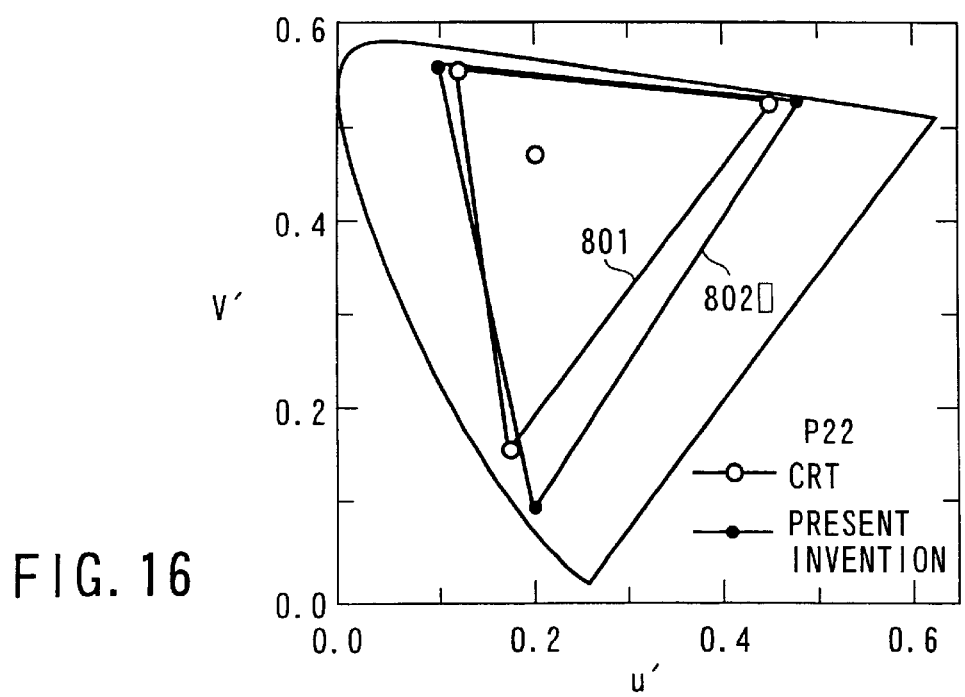
FIG. 16 is a chromaticity diagram showing the RGB color reproducing region obtained by the combination with P22 phosphor in the first embodiment of the present invention.

The RGB color reproducing regions are given by the combination of the RGB transmission curves 701, 702, 703 of the color shutter and the emission spectrum 704. The result is given by a color reproducing region 802 in FIG. 16. In the graph of FIG. 16, the RGB color reproducing region in the ordinary CRT, in which the RGB display is performed by the spatial color mixing display by using the P22 phosphor, is represented by a reference numeral 801.

Figure 7:
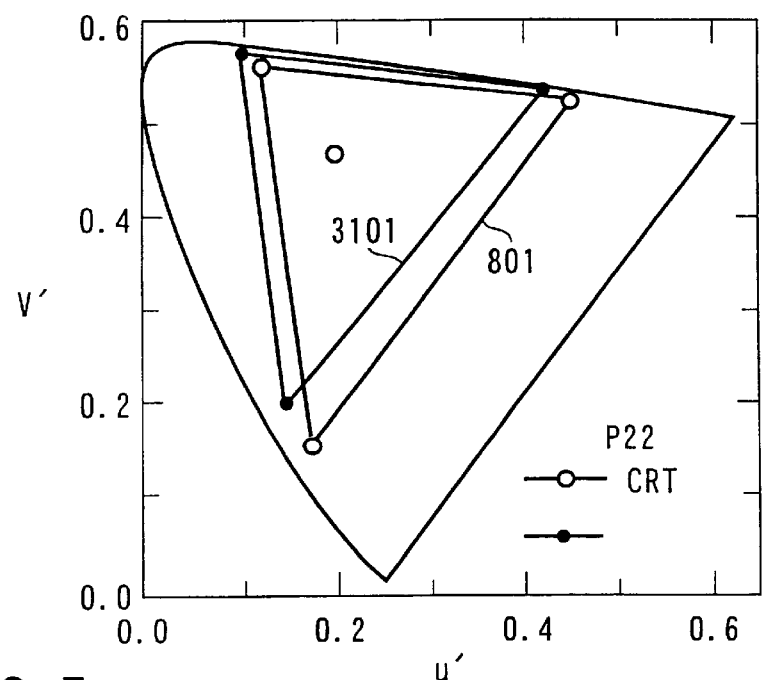
FIG. 7 is a chromaticity diagram showing the RGB color reproducing region obtained by the combination with the P22 phosphor in the conventional color shutter.
Figure 8:
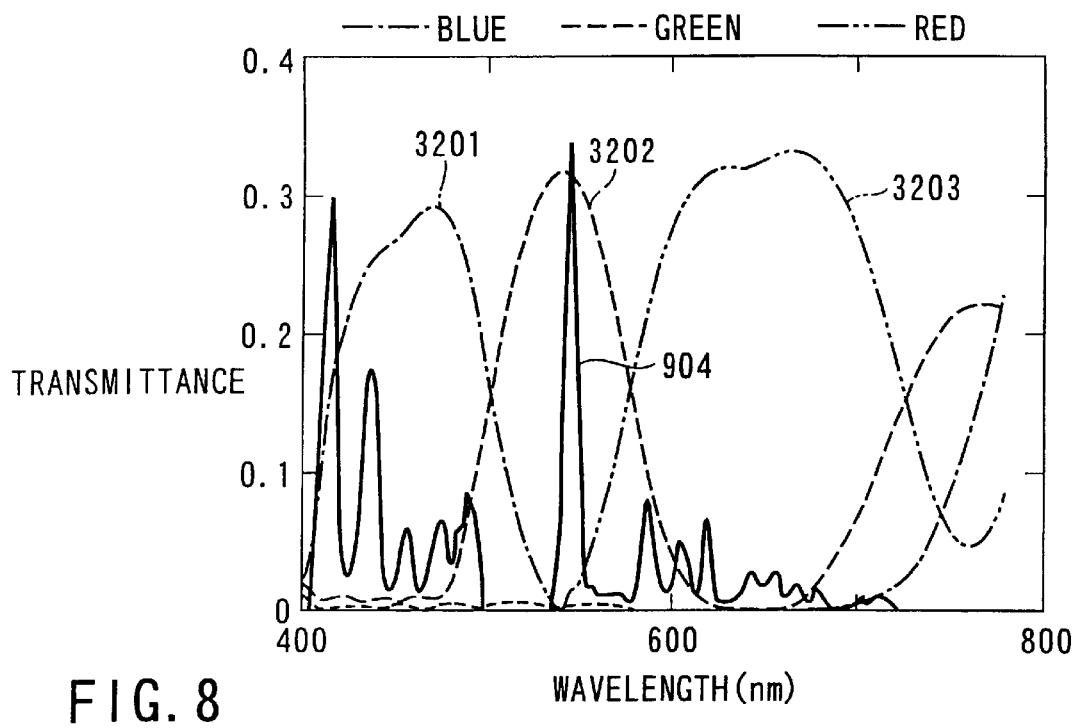
FIG. 8 is a graph showing the RGB spectral transmittance characteristics and the P45 phosphor emission spectrum obtained in the conventional color shutter.
Figure 9:
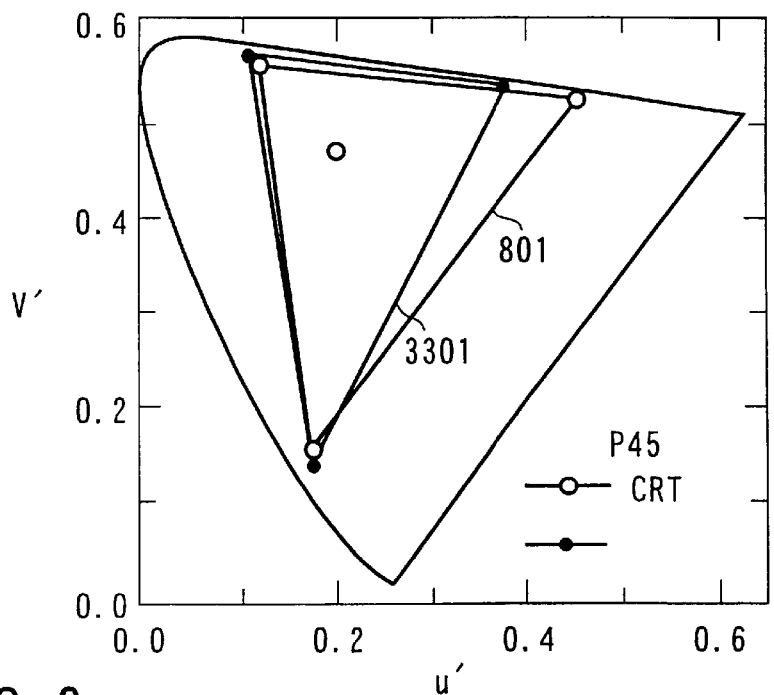
FIG. 9 is a chromaticity diagram showing the RGB color reproducing region obtained by the combination with the P45 phosphor in the conventional color shutter.

As apparent from FIG. 16, the color reproducing region in the case where the color image display is performed by combining the color shutter in this embodiment with the monochromatic CRT is high in chroma in the displayed color of all of the RGB colors and exhibits a broad color reproducing region, compared with the ordinary CRT and the conventional apparatus shown in FIG. 7.

Figure 17:
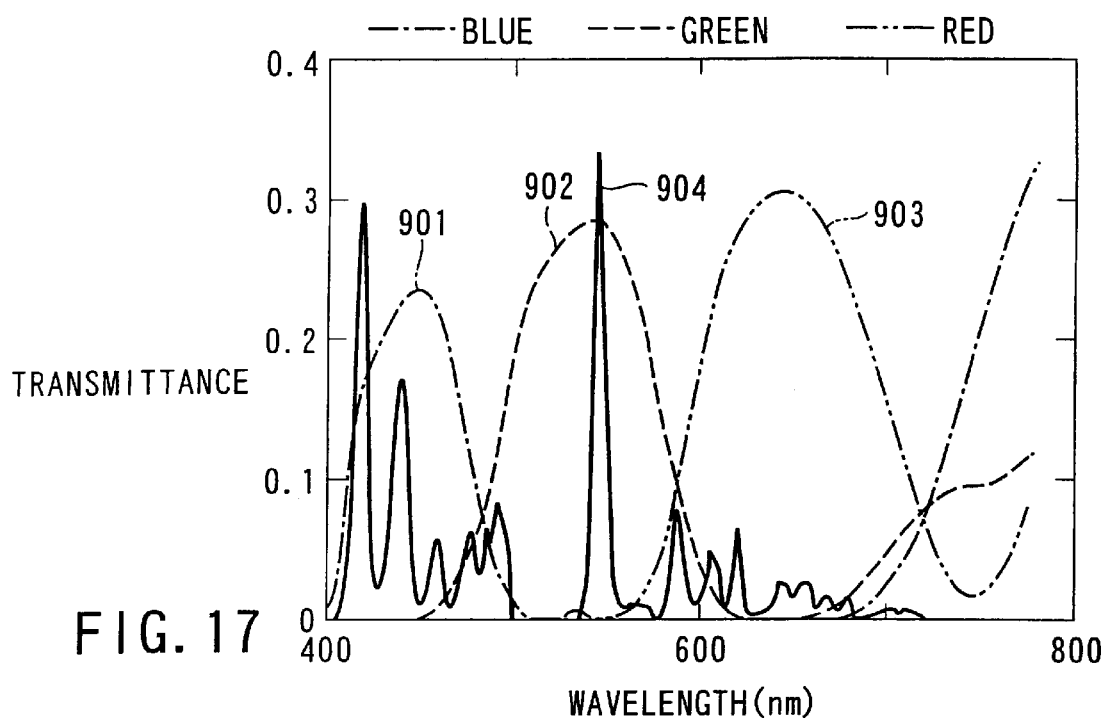
FIG. 17 is a graph showing the RGB spectral transmittance characteristics and the P45 phosphor emission spectrum obtained in the first embodiment of the present invention.
Figure 18:
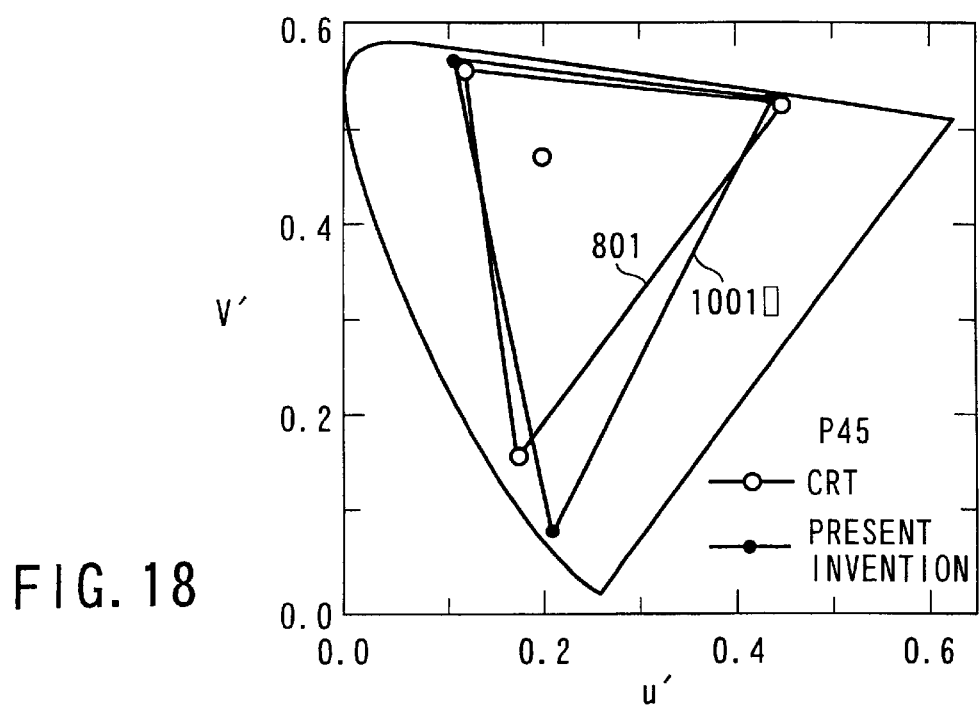
FIG. 18 is a chromaticity diagram showing the RGB color reproducing region obtained by the combination with P45 phosphor in the first embodiment of the present invention.

Also, the RGB color reproducing region in the case where the color display was performed by combination with the monochromatic CRT using a three wavelength phosphor P45 (curve 904 in FIG. 17) for CRT widely used for the color shutter is represented by a reference numeral 1001 in FIG. 18. In this case, it is seen that the chromaticity in the red and green display is substantially equal to that in the ordinary CRT, and the chromaticity for blue is markedly improved.

EXAMPLE 2

Figure 19:
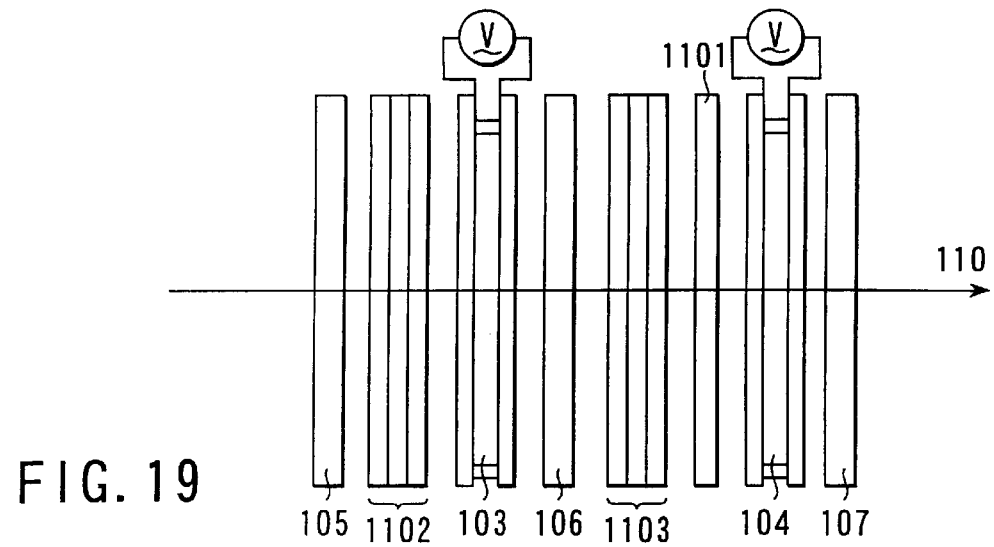
FIG. 19 shows the construction of a color shutter according to a second embodiment of the present invention.

FIG. 19 schematically shows the construction of a color shutter according to a second embodiment of the present invention. In this embodiment, each of two birefringent retardation film layers 1102 and 1103 is of a three-layer structure, and a red polarizer 1101 alone is added as a partial polarizer so as to simplify the construction of the color shutter shown in FIG. 10 and to improve the transmittance.

Table 3 shows the optical parameters of each optical element. The polarization main axes at the light-emitting plane of the first birefringent retardation film layer 1102 are 0° and 90° as in the first embodiment. However, the direction of the transmission axis of the polarized light of the first achromatic polarizer is 8.1°, which is not equal to that for the previous main axis. This is intended to sharpen the cut-off characteristics of the blue/yellow color polarizer formed by the achromatic polarizer 105 and the birefringent retardation film layer 1102.

It should be noted that the retardation value of the first birefringent retardation film layer 1102 is 580 nm. Needless to say, however, it is possible to make the first and second layers common with a single layer of a birefringent retardation film having a retardation value of 1160 nm.

TABLE 3

| | Kind | Polarizing axis | Direction |
|---|---|---|---|
| 105 | N polarizer | Transmission axis | 8.1° |
| 1102 | Retardation film 1 | Fast axis | −9.9° |
| 580 nm | Retardation film 2 | Fast axis | −9.9° |
| | Retardation film 3 | Fast axis | 45.0 |
| 103 | Liquid crystal cell | Fast axis | 45°/90° |
| 106 | N polarizer | Absorption axis | 0° |
| 1103 | Retardation film 1 | Fast axis | 8.7° |
| 630 nm | Retardation film 2 | Fast axis | 35.8° |
| | Retardation film 3 | Fast axis | 67.3° |
| 1101 | R polarizer | Absorption axis | 0° |
| 104 | Liquid crystal cell | Fast axis | 45°/90° |
| 107 | N polarizer | Transmission axis | 0° |

Figure 20:
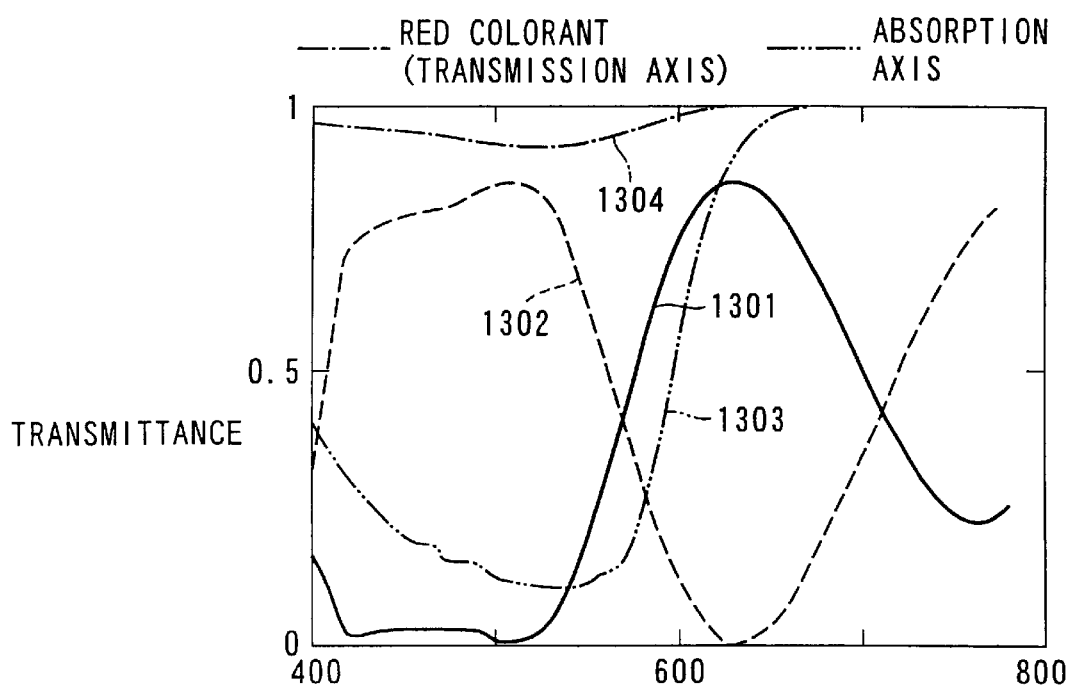
FIG. 20 is a graph showing the spectral transmittance characteristics obtained by the second full wavelength polarizer and the second retarder and the spectral transmittance characteristics of the first partial polarizer in the second embodiment of the present invention.

FIG. 20 show red/cyan spectral transmittance curves 1301, 1302 of the red/cyan color polarizer formed by the second achromatic polarizer 106 and the second birefringent retardation film layer 1103, and absorption axis/transmission axis spectral transmittance curves 1303, 1304 of the red polarizer 1101, which is a partial polarizer.

As in the first embodiment, the component below 600 nm is absorbed by the absorption axis transmission curve 1303 of the red polarizer, with the result that the chromaticity is markedly improved during the red display. It should be noted that the retardation value for each of the layers constituting the second birefringent retardation film layer is 630 nm.

Figure 21:
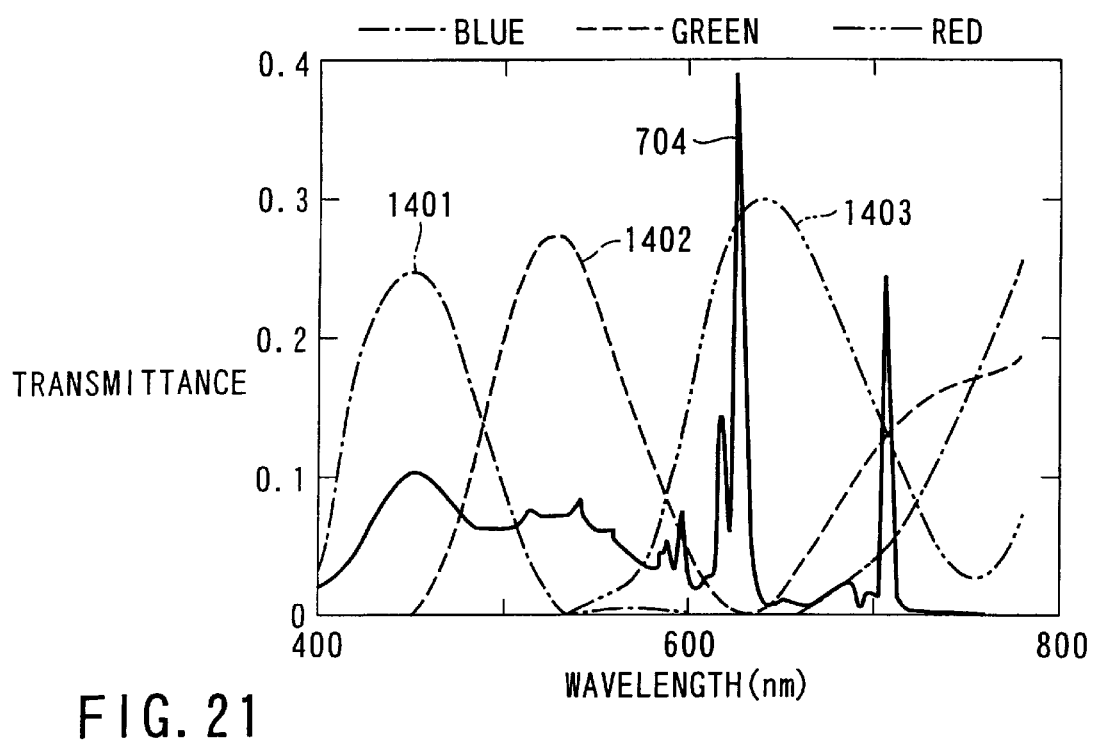
FIG. 21 is a graph showing the RGB spectral transmittance characteristics and the P22 phosphor emission spectrum obtained in the second embodiment of the present invention.
Figure 22:
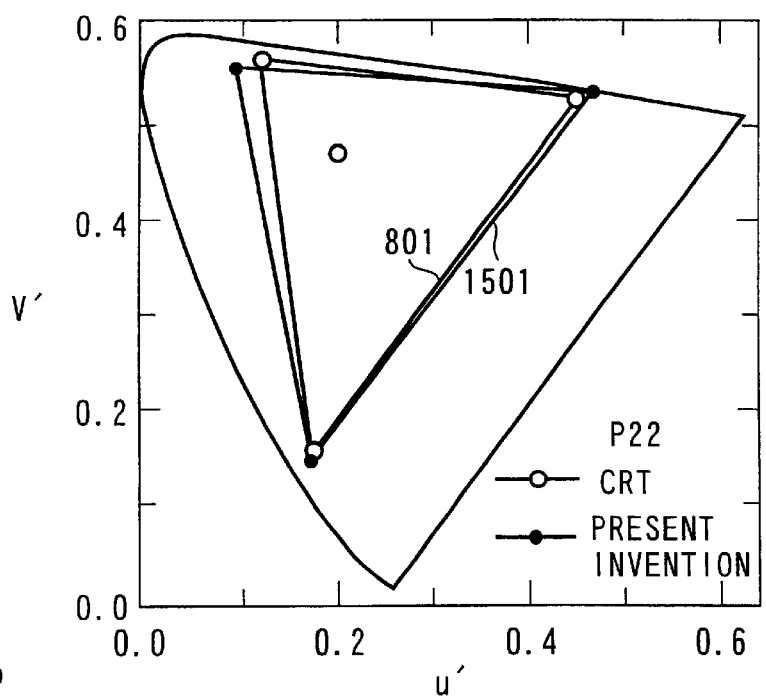
FIG. 22 is a chromaticity diagram showing the RGB color reproducing region obtained by the combination with P22 phosphor in the second embodiment of the present invention.

FIG. 21 shows the RGB spectral transmittance characteristics obtained by the color shutter in this embodiment and the emission spectrum of the P22 phosphor. The RGB color reproducing region obtained by using these transmittance curves and the emission spectrum, which is denoted by a reference numeral 1501 in FIG. 22, is equal to or larger than the color reproducing region 801 of the ordinary CRT.

EXAMPLE 3

Figure 23:
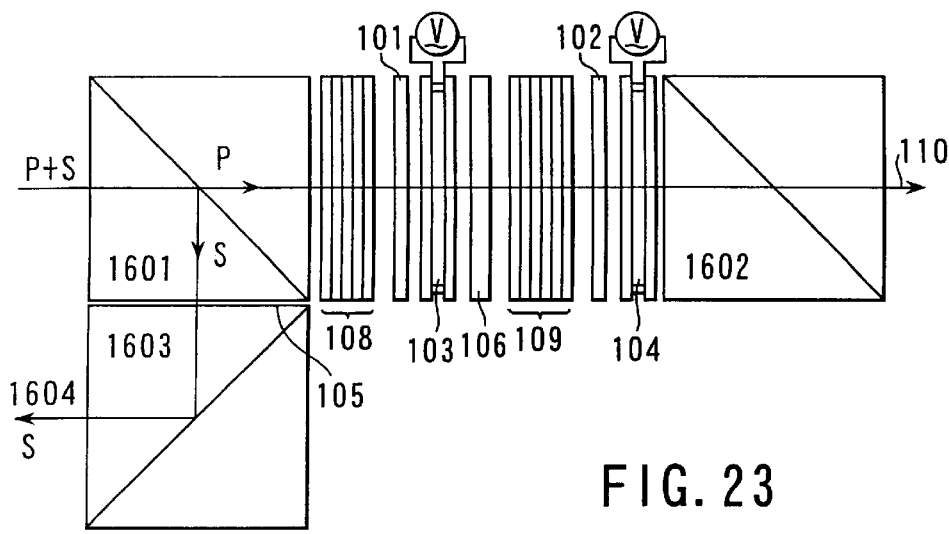
FIG. 23 shows the construction of a color shutter according to a third embodiment of the present invention.

FIG. 23 schematically shows the construction of a color shutter according to a third embodiment of the present invention. The color shutter in this embodiment is most greatly featured in that a polarized light beam splitter (PBS) 1601 is substituted for the achromatic polarizer 105, which is a full wavelength polarizer, is used in the color shutter shown in FIG. 10, and that a polarized light beam splitter (PBS) 1602 is substituted for the achromatic polarizer 107, which is a third full wavelength polarizer, is used in the color shutter shown in FIG. 10. The particular construction employed in the third embodiment makes it possible to improve the light-resistance and the heat resistance so as to facilitate the use in a projection type display apparatus.

It is possible to form a color liquid crystal projector performing a field-sequential color mixing display by allowing a white light to be incident on the color shutter and by arranging a liquid crystal light valve and a projection lens on the light-emitting side of the PBS 1602, though the particular construction is not shown in the drawing. Further, it is possible to improve the light utilization efficiency by adding the PBS 1603 on the opposite side of the PBS 1601. It should be noted in this connection that an S polarized light component reflected by the PBS 1601, which is the first full wavelength polarizer, is reflected toward the light source via the PBS 1603 so as to be utilized again as an illuminating light, leading to the improved light utilization efficiency.

The present invention is not limited to the embodiments described above. For example, it is possible to use a PBS in place of the achromatic polarizer 106, which is the second full wavelength polarizer. It is also possible to use an achromatic polarizer in place of the PBS 1602, which is the third full wavelength polarizer. In addition, the optical path need not form a straight line. It is possible to modify appropriately the shapes of the optical path. For example, it is possible for the optical path to be L-shaped or ⊐-shaped, which is formed by adding a reflecting plane.

Examples relating to various modifications of the color shutter of the present invention will now be described.

EXAMPLE 4

Figures 24A, 24B:
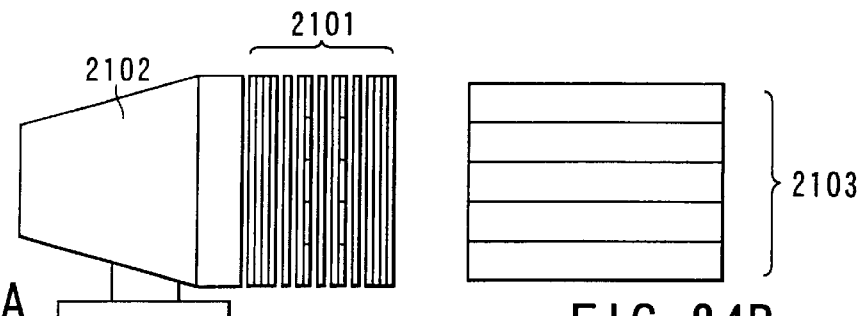
FIG. 24A shows the construction of a combination of a color shutter and a CRT according to a fourth embodiment of the present invention.
FIG. 24B shows a plurality of divided display regions of the color shutter shown in FIG. 24A.

FIG. 24A shows combination of a color shutter and a CRT according to fourth example of the present invention. As shown in the drawing, a color shutter 2101 is arranged in front of a monochromatic CRT 2102 capable of a double speed display on the basis of a field-sequential additive color mixing. Also, as shown in FIG. 24B, a display region 2103 of the color shutter 2101 is divided into a plurality of stripes. Each divided stripe region can be driven independently.

To be more specific, each of, for example, the liquid crystal cells 103 and 104 included in Example 1 shown in FIG. 10 comprises a pair of substrates, and transparent electrodes are arranged inside these substrates on the side of the liquid crystal layer. One of these transparent electrodes is divided into the striped regions and the other transparent electrode is used as a common electrode. Also, a voltage apply means is mounted independently to the terminal of each striped electrode. Needless to say, the divided regions for the liquid crystal cell 103 must conform with the divided regions of the other liquid crystal cell 104.

Figure 25A:
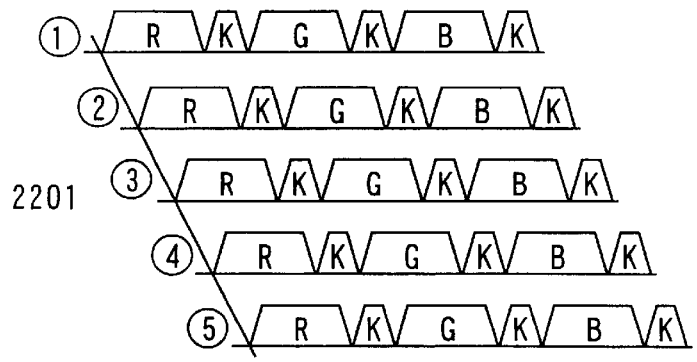
FIGS. 25A and 25B show the driving method of the color shutter shown in FIG. 24A.
Figure 25B:
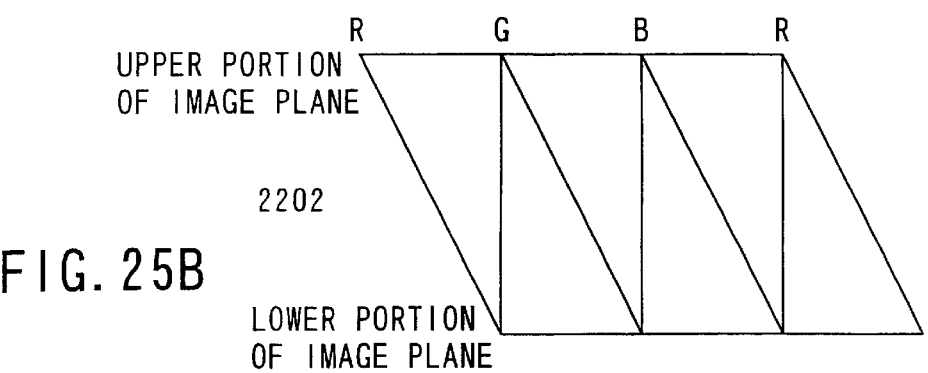

FIGS. 25A and 25B show the driving method of the color shutter of this embodiment. The RGB images are sequentially scanned from an upper portion toward the lower portion of the screen of the monochromatic CRT 2102 in accordance with the driving sequence shown in FIG. 25B, with the result that images are sequentially displayed by the light emission from the white phosphor coated on the CRT display screen. In accordance with the scanning, the display of the color shutter is sequentially switched by equidistantly delaying the phase by the number of striped divided regions, as shown in FIG. 25A. By this particular construction, it is possible to allow the color shutter to display the correct display color during the light emission and afterglow of the phosphor immediately after the scanning without particularly providing a scanning cease period.

In this embodiment, a liquid crystal mode in which the displayed color is selected by the polarity of the voltage applied thereto, e.g., a ferroelectric liquid crystal, is used as the liquid crystal material of the liquid crystal cell constituting the color shutter. Therefore, a black (K) display period was provided at the period during which the light emission of the phosphor is sufficiently attenuated in order to allow the average voltage applied to the liquid crystal during one frame period to become 0 V.

To be more specific, where, for example, the "+, +" polarities achieve an R (red) display, the "+, −" polarities achieve a G (green) display, the "−, +" polarities achieve a B (blue) display, and the "−, −" polarities achieve a K (black) display, the K display period is made ⅓ the display period of each of RGB and is inserted in the switching time of the RGB displays in order to permit the four displayed colors to be displayed for the same period during one frame period. Incidentally, the K period need not be inserted in the case of using a liquid crystal operation mode in which the displayed color is switched by the application of AC voltage and 0 V like the PI cell.

EXAMPLE 5

Figure 26A:
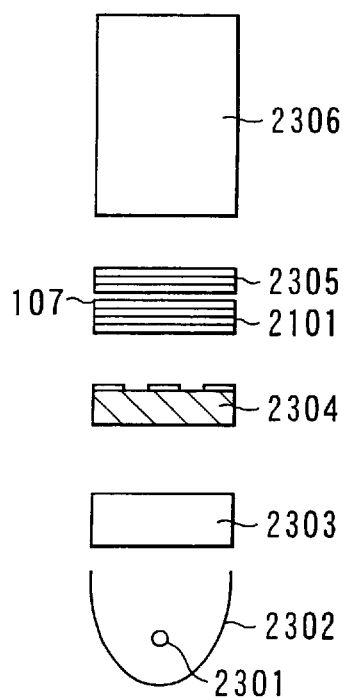
FIG. 26A shows the construction in which a color shutter is used in a transmission type single plate liquid crystal projector according to a fifth embodiment of the present invention.

FIG. 26A shows the construction in the case where a color shutter is used in a transmission type single plate liquid crystal projector according to a fifth example of the present invention. In the construction shown in FIG. 26A, the illuminance of the light emitted from the light source section consisting of a high pressure mercury lamp or a metal halide lamp 2301 and a parabolic or elliptical reflector 2302 is made uniform by an optical integrator and, then, the light is incident on a polarized light converting optical element 2304.

The polarized light converting optical element 2304 is an optical element for converting the unpolarized light emitted from the light source section into a linear polarized light by utilizing the polarized light separating function of a polarized light beam splitter (PBS) and the polarized light rotating function of the birefringent retardation film.

The linear polarized light coming from the polarized light converting optical element 2304 is incident on the color shutter 2101 in a manner to be coincident with the transmission axis of the incident polarized light so as be sequentially switched into the RGB display color so as to illuminate a transmission type TFT liquid crystal light valve 2305.

Needless to say, the transmission axis of the polarized light on the light-emitting side of the color shutter coincides with the axis of the incident polarized light of the TFT-LCD. The transmission type TFT liquid crystal light valve 2305 performs a field-sequential additive color mixing display in synchronization with the switching of the displayed color of the color shutter, and the image is transmitted through a projecting lens 2306 or is projected on a reflecting screen.

The particular construction described above makes it possible to obtain an image of the resolution equal to that of a three-plate system by a single plate construction, leading to a merit that the optical system is made compact and light in weight.

It should also be noted that, by arranging the polarized light converting optical system in the front stage of the color shutter, the transmittance of the color shutter can be improved. Further, since it is possible for the polarizer 107 on the light-emitting side of the color shutter to act also as a polarizer on the incident side of the transmission type TFT liquid crystal light valve, it is possible to improve the utilization efficiency of light and achieve the cost reduction because of elimination of the member of the apparatus.

The display of the color shutter, even if divided into small regions, can be collectively switched as in Example 4. Where the color shutter is divided into small regions, it is necessary for the color shutter to be arranged in direct contact with the liquid crystal light valve such that the dividing lines of the color shutter may be arranged along the pixel pitch boundary of the liquid crystal light valve and may be positioned within the focus depth of the projecting lens.

Figure 26B:
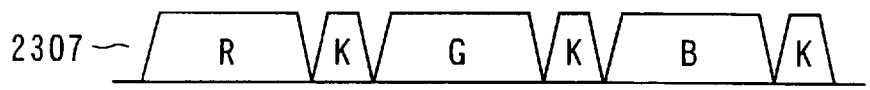
FIGS. 26B and 26C show the driving sequence of the color shutter shown in FIG. 26A.
Figure 26C:
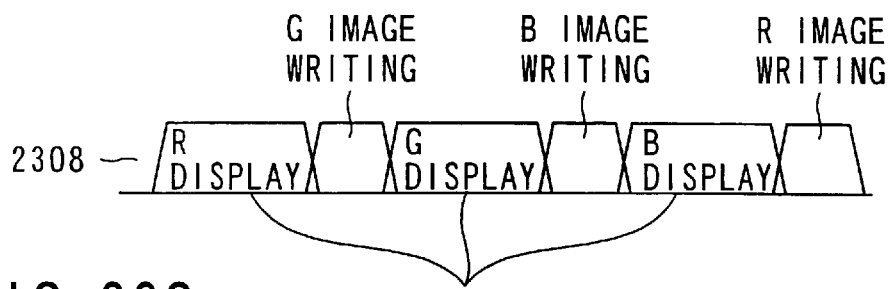

It is desirable for the driving sequence of the color shutter to include black display periods as shown by a reference numeral 2307 in FIG. 26B. When it comes to the driving sequence of the liquid crystal light valve, it is desirable for the screens to be renewed during the black display period, as denoted by a reference numeral 2308 in FIG. 26C. In this case, a merit can be obtained that the dynamic image is unlikely to be deteriorated.

EXAMPLE 6

Figure 27:
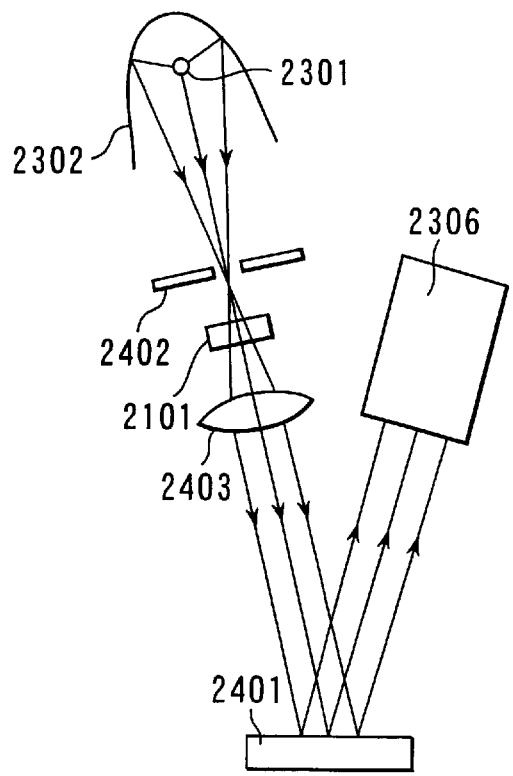
FIG. 27 shows the construction in which a color shutter is used in DMD according to a sixth embodiment of the present invention.

FIG. 27 shows the construction in the case where the color shutter is used in a DMD according to the sixth example of the present invention. In this example, a DMD 2401, which is a reflection type display device, provides a monochromatic image display element for performing a field-sequential additive color mixing display. As shown in the drawing, a color shutter 2101 is arranged in the vicinity of a slit 2402 formed in the optical path.

DMD is required to collect the illuminating light as apparent from the operating principle. It is possible to miniaturize the color shutter by arranging the color shutter in the vicinity of the slit acting as the light collecting portion.

The driving sequence of the color shutter is equal to that in Example 5. However, the collective switching of the entire screen is desirable because the color shutter fails to fall within the focus depth of the projecting lens.

EXAMPLE 7

Figure 28:
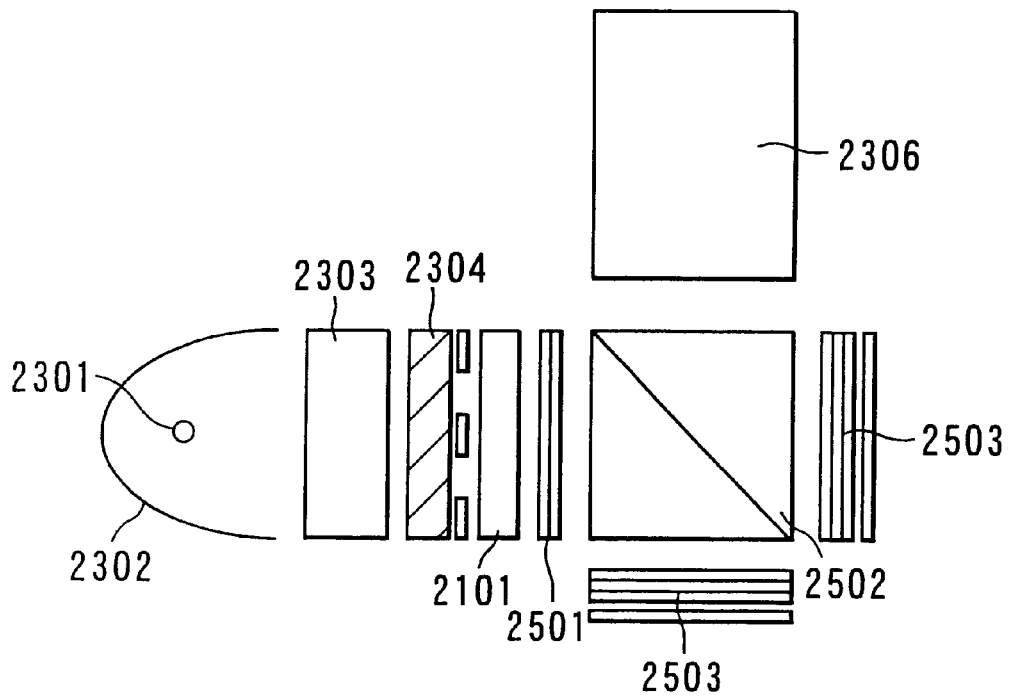
FIG. 28 shows the construction in which a color shutter is used in a two plate reflection type liquid crystal projector according to a seventh embodiment of the present invention.

FIG. 28 shows the construction in the case where the color shutter is used in a two plate reflection type liquid crystal projector according to the seventh example of the present invention. In this example, a polarizing plane rotary element 2501 capable of rotating by 90° the incident polarizing plane is added behind the color shutter 2101 so as to switch the polarizing plane on the light-emitting side of the color shutter in synchronization with the switching of the displayed color.

The particular construction makes it possible to select the transmission and reflection of PBS 2502, making it possible to select the reflection type liquid crystal valve on which the illuminating light is to be incident from among the reflection type liquid crystal valves 2502 and 2503.

Figure 29:
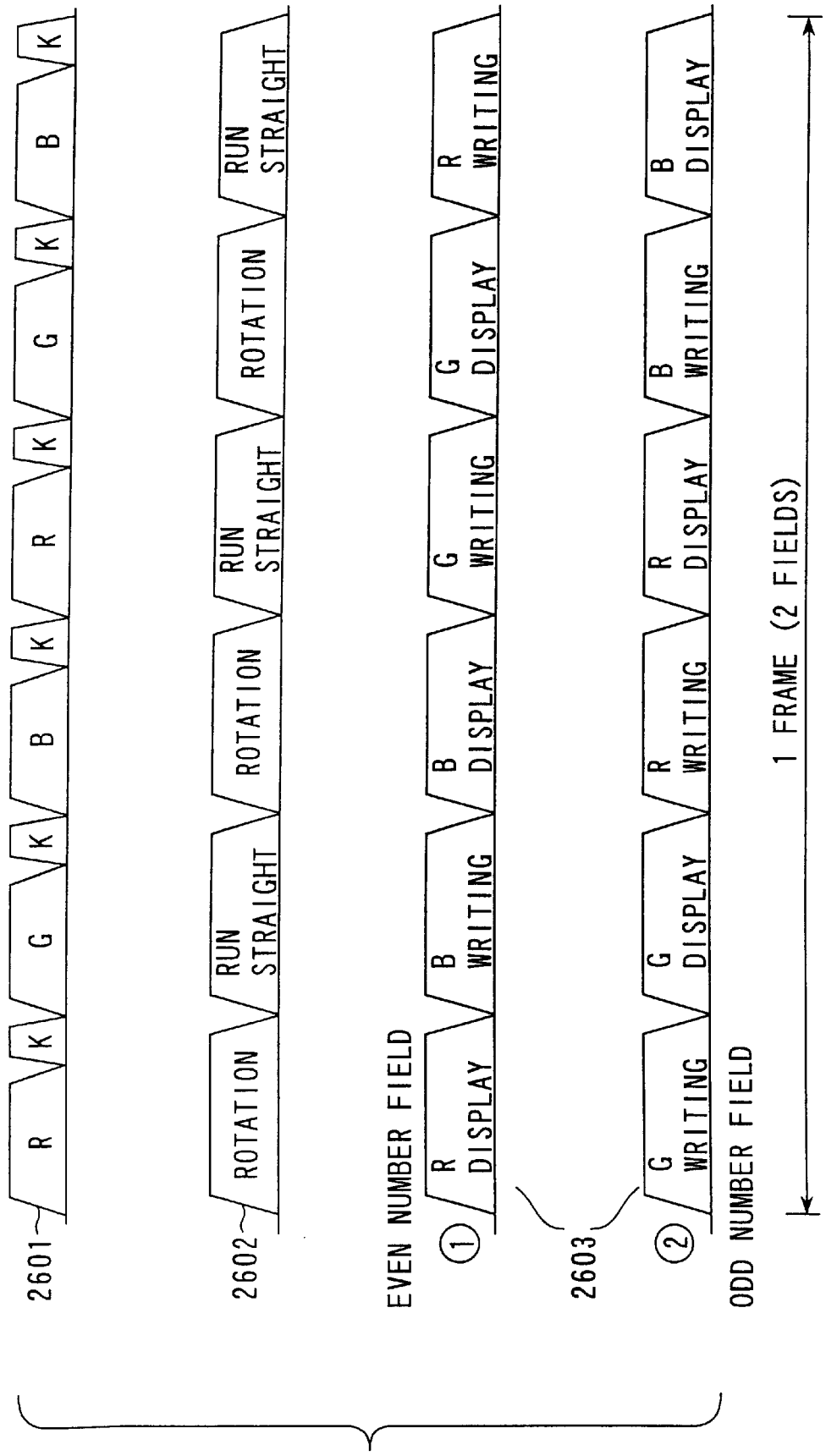
FIG. 29 shows the driving method of the color shutter according to the seventh embodiment of the present invention.

Also, the particular construction makes it possible to perform alternately the renewal and display of the image displayed on the liquid crystal light valve, as denoted by driving sequences 2601, 2602 and 2603 in FIG. 29. As a result, it is possible to widen the write time in the liquid crystal light valve, making it possible to display a high quality image small in crosstalk between adjacent displayed images and to make the optical system compact.

Further, it is possible to obtain twice the resolution relative to the single plate type liquid crystal projector by deviating the image forming position on the screens of the reflection type liquid crystal light valves 2502 and 2503 by about half the pixel. Also, it is possible to allow the deviation of the pixel pitch to correspond accurately to the interlace image signal, if the image of the even number field is displayed on the liquid crystal light valve 2502 and the image of the odd number field is displayed on the liquid crystal light valve 2503 in order to obtain alignment with the picture image element in the interlace display.

EXAMPLE 8

Figure 30:
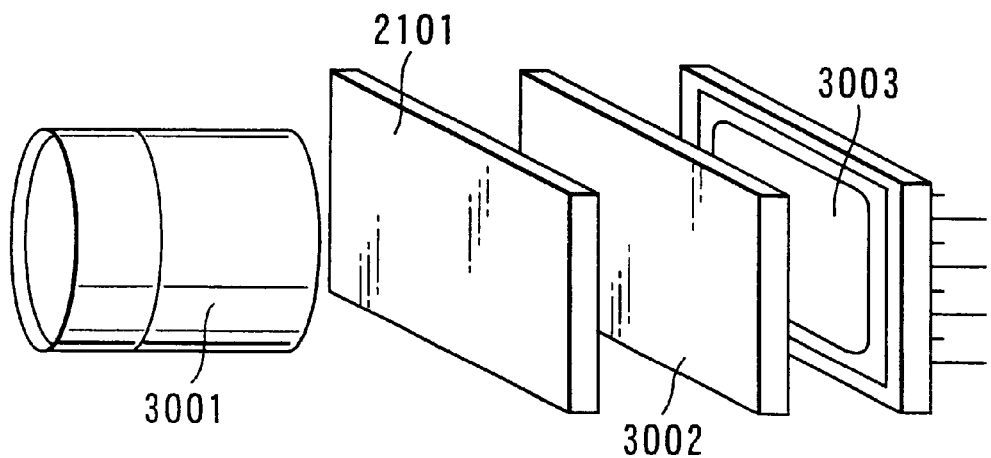
FIG. 30 shows the construction in which a color shutter is used in an image pickup tube according to an eighth embodiment of the present invention.

FIG. 30 shows the construction of the case where the color shutter is used in an image pickup apparatus according to an eighth example of the present invention. The image pickup apparatus in this example consists of an image pickup lens 3001, a color shutter 2101, a luminosity-color balance correcting filter 3002 and an image pickup element (CCD) 3003.

In performing the image pickup in this apparatus, the information on the object supplied from the image pickup lens 3001 is supplied to the color shutter 2102 and the displayed color of the color shutter is sequentially switched into R, G, B so as to obtain a color image. The color image thus obtained is supplied to the image pickup element (CCD) 3003 through the luminosity-color balance correcting filter 3002 so as to obtain an electric signal.

The image pickup apparatus of the particular construction is simple in construction, compared with the conventional three-color pickup apparatus using a color separation prism, and is capable of obtaining a resolution equivalent to that of the conventional apparatus. Incidentally, it is possible to change the arranging positions of the luminosity-color balance correcting filter 3002 and the color shutter 2102 such that the color shutter 2102 is positioned adjacent to the image pickup lens 3001.

In the color shutter of the present invention, the spectral balance of RGB can be designed relatively freely, as described above. Therefore, it is possible to omit the correcting filter 3002 by designing the spectral characteristics of the color shutter in view of the spectral sensitivity characteristics of the image pickup element (CCD) 3003.

On the other hand, since the color shutter is a polarizing element, it is desirable to mount a birefringent retardation film (not shown) on the entire surface of the image pickup lens 3001 in the case of image-picking up of an object including a polarizing component such as a water surface or a glass.

As described above in detail, according to the color shutter of the present invention, it is possible to improve the color purity of the RGB displayed colors while improving the transmittance by arranging in a suitable combination three polarizers, two retarders, two polarizing rotators and at least one absorption type partial polarizer.

In other words, in the color shutter of the present invention, it is possible to suppress the number of birefringent retardation films required for forming a PRS to the minimum number, making it possible to suppress the troublesomeness in the manufacturing process and the reduction in the transmittance. Also, in the color shutter of the present invention, it is possible to set independently the cut-off of the intermediate wavelength region for improving the color purity between different colors and on the sides of the long wavelength and short wavelength. For example, the color purity of blue can be improved by designing the cut-off of PRS with blue between the wavelength regions of blue and green. Also, the color purity of green can be improved by allowing a yellow chromatic polarizer to absorb the short wavelength component of green.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color shutter, comprising:
    first, second and third polarizers polarizing the incident light over the entire region of visible wavelengths and arranged in the order mentioned as viewed from the side of the incident light;
    first and second retarders each having a plurality of birefringent layers;
    first and second polarizing rotators changing the angle of rotation of the polarizing plane by application of a voltage over the entire region of visible wavelengths of the incident light; and
    at least one absorption type partial polarizer converting the incident light into a polarized light by absorbing a part of wavelength regions of the incident light,
    wherein said first retarder is arranged between said first polarizer and said second polarizer;
    said second retarder is arranged between said second polarizer and said third polarizer;
    said first polarizing rotator is arranged between said first polarizer and said second polarizer;
    said second polarizing rotator is arranged between said second polarizer and said third polarizer;
    at least one of the first polarizing rotator and the second polarizing rotator is arranged in a manner to be sandwiched between the second polarizer and the first or second retarder;
    said absorption type partial polarizer is arranged between the first polarizing rotator and the first retarder and/or between the second polarizing rotator and the second retarder; and
    a transmitted light can be changed into three primary colors of RGB by selecting the voltage applied to the first and second polarizing rotators.

2. The color shutter-according to claim 1, wherein:
    a transmitted spectrum of a first polarization axis among first and second polarization axes perpendicular to each other on a light emitting plane of the first retarder constitutes one of the three primary colors in an additive color mixing display;
    a transmitted spectrum of the second polarization axis constitutes a complementary color of the transmitted spectrum transmitted through the first polarization axis;
    a transmitted spectrum of a third polarization axis among third and fourth polarization axes perpendicular to each other on a light-emitting plane of the second retarder constitutes one of the three primary colors in the additive color mixing display, which differs from the color of the polarized light transmitted through the first polarization axis in the light-emitting plane of the first retarder;
    a transmitted spectrum of the fourth polarization axis constitutes a complementary color of the wavelength spectrum transmitted through the third polarization axis; and
    a direction of an absorption axis of the absorption type partial polarizer is in a direction substantially coincident with the direction of the polarization axis of the neighboring retarder.

3. The color shutter according to claim 1, wherein at least one of the polarizer selected from the group consisting of said first, second and third polarizers is an achromatic polarizer selected from the group consisting of an absorption type polarizer, a polarized light beam splitter, a circular polarizer and a linear polarizer.

4. The color shutter according to claim 1, wherein said retarder is birefringent retardation film selected from the group consisting of polycarbonate, polyvinyl alcohol, polysulfone and polymethyl methacrylate or a birefringent optical crystal selected from the group consisting of $SiO_2$ and $LiNbO_3$.

5. The color shutter according to claim 1, wherein said retarders are uniaxial retardation films or biaxial retardation films having a laminate structure having at least three layers.

6. The color shutter according to claim 1, wherein said polarizing rotator is a liquid crystal cell having a retardation of 200 to 300 nm, a response time not longer than 1.5 ms, and capable of switching the polarized plane rotating angle of the incident light between 0° (180°) and 90°.

7. The color shutter according to claim 6, wherein said liquid crystal cell is twisted nematic cell, a super twisted nematic cell, PI twist cell or an optically compensated birefringence cell each using a nematic liquid crystal material, or a surface stabilized ferroelectric liquid crystal cell, a deformed helix ferroelectric liquid crystal cell, an antiferroelectric liquid crystal cell or a threshold-less antiferroelectric liquid crystal cell each using a smectic liquid crystal material.

8. The color shutter according to claim 1, wherein said absorption type partial polarizer is a chromatic polarizer containing a dichroic colorant that permits absorbing a short wavelength component and transmitting a long wavelength component.

9. The color shutter according to claim 8, wherein said chromatic polarizer is at least one polarizer selected from the group consisting of a yellow polarizer, a red polarizer and a magenta polarizer.

10. The color shutter according to claim 1, wherein an absorption axis in said absorption type partial polarizer is capable of absorbing a region on the side of a short wavelength in a visible wavelength range, and an absorption edge is present on the side of a long wavelength, compared with a wavelength region of transmitted wavelength spectrum in a polarizing axis substantially conforming with an absorption axis in the first polarizer and the first retarder or in the second polarizer and the second retarder.

11. A color image display apparatus, comprising:

an image display mechanism displaying a monochromatic two dimensional image; and the color shutter recited in claim 1 arranged on a front surface of a display screen of said image display mechanism, wherein said image display mechanism field-sequentially displays a monochromatic image for three primary colors of RGB, and a transmitted color of the color shutter can be switched in synchronization with the image display.

12. The color image display apparatus according to claim 11, wherein said image display mechanism comprises at least one element selected from the group consisting of a cathode ray tube, a field emission display, a plasma display panel, an inorganic or organic electro luminescence display, and a thin film transistor-liquid crystal display.

13. The color image display apparatus according to claim 11, wherein said display apparatus is at least one kind of the display apparatus selected from the group consisting of a direct view type image display device, a projection type display device, and a single plate reflection type projector using a digital micro mirror device.

14. The color image display apparatus according to claim 11, wherein the display region of said color shutter is divided into a plurality of stripe regions that can be driven independently of each other.

15. The color image display apparatus according to claim 11, wherein said image display mechanism comprises a transmission type thin film transistor-liquid crystal light valve.

* * * * *